(12) United States Patent
Gould

(10) Patent No.: US 11,144,741 B2
(45) Date of Patent: Oct. 12, 2021

(54) ELECTRONIC TRACKING AND MONITORING SYSTEM AND HARDWARE FOR TRACKING ACTIVITY OF ARTICLES RETAINED IN A SECURITY ENCLOSURE

(71) Applicant: LOCKIT SYSTEMS PTY. LTD, Balmain (AU)

(72) Inventor: Richard Gould, Balmain (AU)

(73) Assignee: LOCKIT SYSTEMS PTY. LTD, Balmain (AU)

( * ) Notice: Subject to any disclaimer, the term of this patent is extended or adjusted under 35 U.S.C. 154(b) by 0 days.

(21) Appl. No.: 16/332,238

(22) PCT Filed: Sep. 12, 2017

(86) PCT No.: PCT/AU2017/000194
§ 371 (c)(1),
(2) Date: Mar. 11, 2019

(87) PCT Pub. No.: WO2018/045412
PCT Pub. Date: Mar. 15, 2018

(65) Prior Publication Data
US 2019/0213366 A1   Jul. 11, 2019

(30) Foreign Application Priority Data

Sep. 12, 2016  (AU) ................................ 2016903666

(51) Int. Cl.
*G06K 7/08* (2006.01)
*G06K 7/10* (2006.01)
(Continued)

(52) U.S. Cl.
CPC .......... *G06K 7/10366* (2013.01); *A47B 81/00* (2013.01); *G06K 19/0723* (2013.01); *G06Q 10/087* (2013.01)

(58) Field of Classification Search
CPC ............ G06K 7/0008; G06K 7/10366; G06K 19/0723; G06F 3/1454; G06F 3/147; A47B 81/00
(Continued)

(56) References Cited

U.S. PATENT DOCUMENTS

| 5,801,628 A | 9/1998 | Maloney |
|---|---|---|
| 6,707,381 B1 | 3/2004 | Maloney |

(Continued)

OTHER PUBLICATIONS

International Search Report for PCT/AU2017/000194, dated Dec. 13, 2017.
(Continued)

*Primary Examiner* — Ahshik Kim
(74) *Attorney, Agent, or Firm* — Stephen J. Weyer, Esq.; Stites & Harbison, PLLC

(57) ABSTRACT

An arrangement for tracking and recording movement of articles between a security enclosure and remote locations which includes releasably retaining the articles in a panel assembly, an electronics panel having a reader for tracking and recording movement of at least one article when the at least one article is moved relative to the panel assembly, taking an article having a unique article identifier and placing the article in a home location via a field of detection of the reader, storing the identity of the article and data indicative of the history and location of the article, allowing authorised users to initiate communications with the security enclosure to determine and track the location and history of movement of the article via an electronic user initiated input device application and creating a record indicative of the movements of the article between a location in said enclosure and remote locations.

26 Claims, 20 Drawing Sheets

(51) Int. Cl.
*G06Q 10/08* (2012.01)
*A47B 81/00* (2006.01)
*G06K 19/07* (2006.01)

(58) Field of Classification Search
USPC .......................................................... 235/451
See application file for complete search history.

(56) References Cited

U.S. PATENT DOCUMENTS

| | | |
|---|---|---|
| 6,748,629 B2 | 6/2004 | Furbow |
| 2004/0160304 A1 | 8/2004 | Mosgrove et al. |
| 2005/0156739 A1 | 7/2005 | Maloney et al. |
| 2005/0156740 A1 | 7/2005 | Maloney et al. |
| 2008/0117053 A1 | 5/2008 | Maloney |
| 2017/0228569 A1* | 8/2017 | Mardkha ............ G06K 7/10425 |

OTHER PUBLICATIONS

Written Opinion of the International Searching Authority for PCT/AU2017/000194, dated Dec. 13, 2017.

* cited by examiner

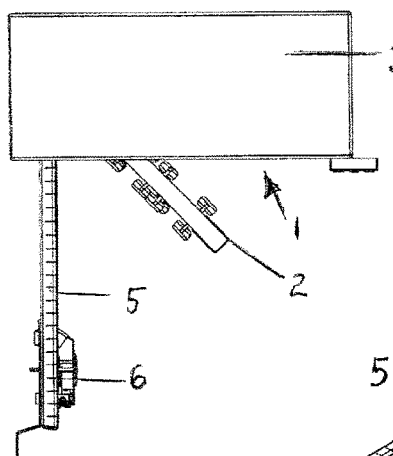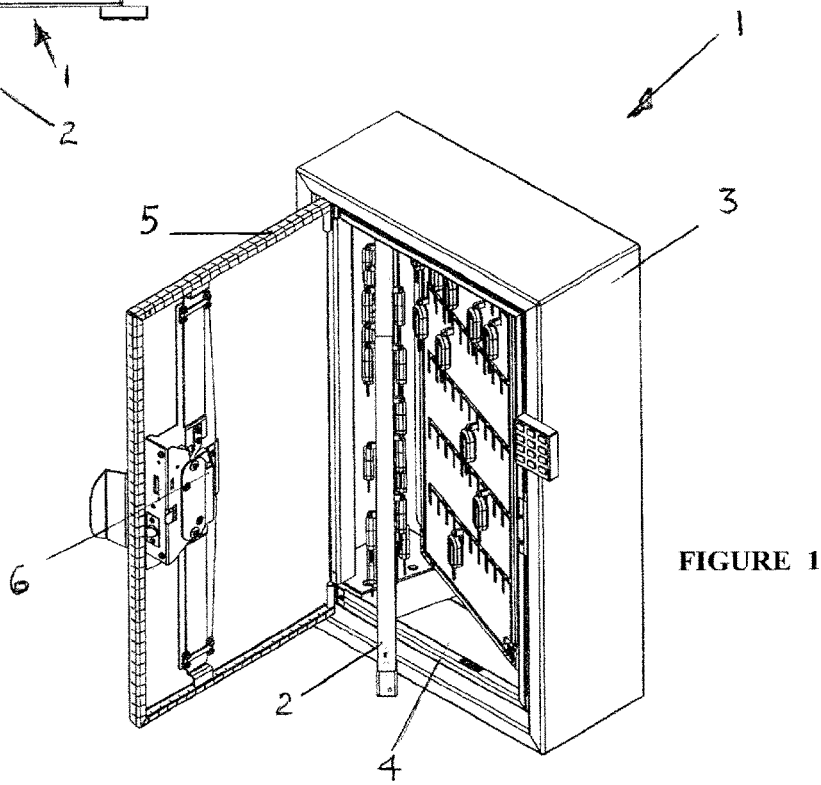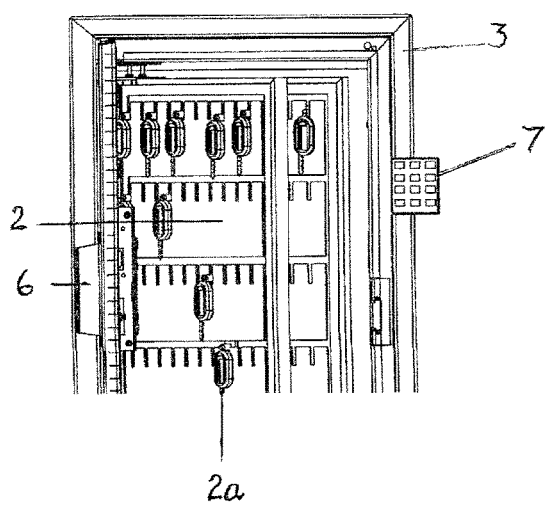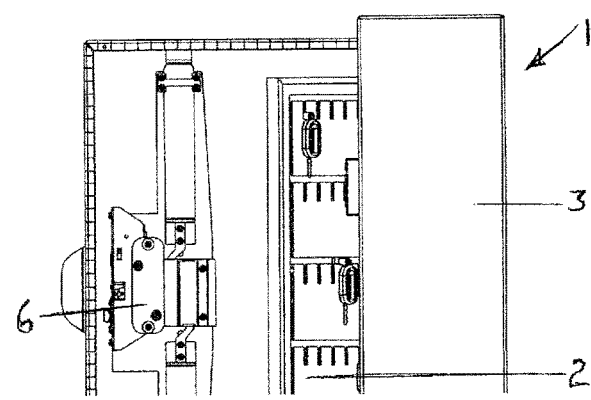
FIGURE 4
FIGURE 1
FIGURE 2
FIGURE 3

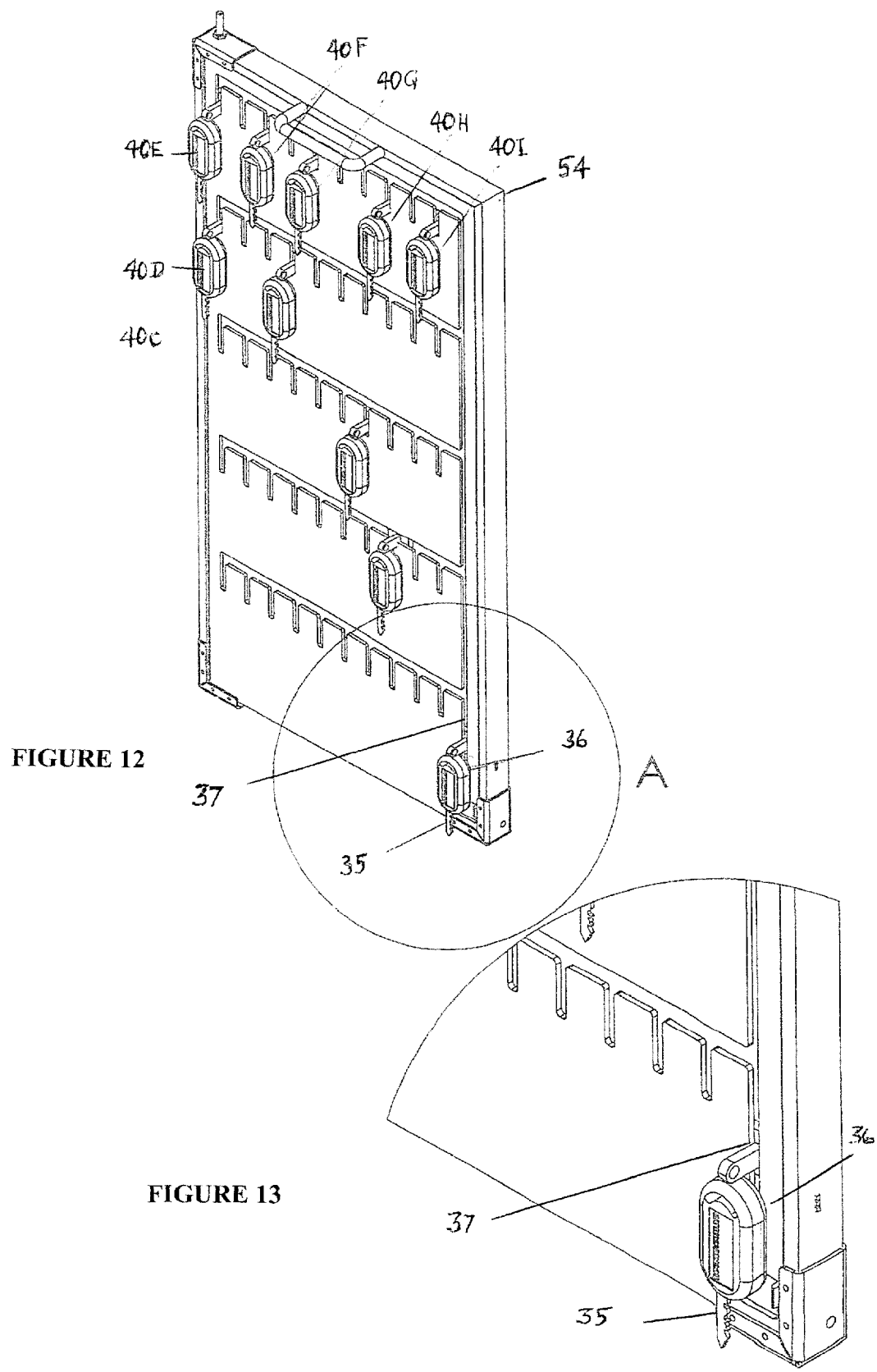

| CABINETS | READY TO approach CABINET with phone.<br><br>Have a pre selected keys list for staff in phone<br><br>APPROACH cabinet to OPEN cabinet with phone with KEYHOUND APP,<br><br>SELECT CABINET A , B , C, D etc.<br><br>PLACE Phone near cabinet and roll open safety slide.<br><br>BLE – communication to CABINET B – DOOR UNLOCKS<br><br>Key list is illuminated for removal by staff.<br><br>Or – remove keys as required. |
|---|---|

FIGURE 32

ELECTRONIC TRACKING AND MONITORING SYSTEM AND HARDWARE FOR TRACKING ACTIVITY OF ARTICLES RETAINED IN A SECURITY ENCLOSURE

BACKGROUND

The present invention relates to tracking and monitoring systems and more particularly relates to a self contained panel assembly which incorporates an electronic tracking and data acquisition system for tracking the movement of articles such as but not limited to motor vehicle keys stored in a security cabinet. The present invention also relates to a self contained panel assembly which is portable and releasable from a security cabinet and which includes an electronics panel which detects movement of articles stored on the panel assembly and which is capable of receiving and storing data related to said movement of articles. The present invention also relates to a method of electronic tracking and history logging of articles retained in a security apparatus. The invention further relates to a method of tracking and activity logging of articles stored in a security environment and which is enabled by a computer applications which allows interaction between a potentially unlimited number of users and a potentially unlimited number of articles such a, but not limited to, vehicle keys.

PRIOR ART

There are in existence various apparatuses and tracking methods for monitoring activity for security reasons, of articles such as keys and other security devices. In circumstances where a large number of security keys and access devices such as swipe cards and the like are used in schools, car yards, hospitals and other institutions, it is necessary to securely store such access devices, swipe cards and keys. There are in existence key storage cabinets which allow the storage of large numbers of keys secured on panels which are retained in the cabinets. The panels comprise an array of slots in which keys are placed. Large number of keys can be stored in this way. The slots allow release from the panels by sliding relative to the slots in the panels which store the individual keys. In simple key storage apparatuses for large numbers of keys the danger is that key use is not properly monitored. Also keys can separate from their slots in a case where a whole panel is removed from storage cabinets and carried for ready user access to the keys. There is an on going need to improve key security, improve the efficiency and utility of systems and methods for such security particularly in circumstances where there are large numbers of keys to track and monitor.

INVENTION

The present invention provides an alternative to the known object tracking and monitoring systems and more particularly provides a self contained article tracking system in which a potentially unlimited number of users are able to track, monitor and obtain data on key panel assembly which incorporates an electronic tracking and data acquisition system for tracking the movement of articles stored in openings in a panel housing which retains an electronics panel. The present invention also provides a self contained electronic tracking and monitoring system to track the activity history of articles such as keys and which is user activated via a user application. The present invention also provides an electronic tracking system which allows storage in a data base of activity history of security articles such as but not limited to keys and which allows matching of keys to key activated equipment, real time user interaction with logged historical activity. The system includes a portable panel assembly which includes electronic intelligence and is releasable from a security cabinet and which includes an electronics panel which detects activity of articles stored on the panel assembly and is capable of receiving and storing data related to said movement of articles.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Through the specification a reference to an article can be taken to include a reference to a key for any purpose such as door keys, lock key, motor vehicle key. Throughout the specification a reference to a key can be taken to include a reference to a mechanical key with an identity tag or the like, an electronic key such as but not limited to swipe keys, card keys, access keys and any key device which initiates the operation of equipment. Throughout the specification a reference to a computer application can be taken to include a reference to computer software, an app downloadable or uploadable to an operating device which enables the device to interact with electronic security system data and with an associated data base. Throughout the specification a reference to a device can be taken to include a reference to an iPhone, iPad, tablet, smart phone, computer, laptop, personalised electronic device capable of interaction with a controller. Throughout the specification a reference to condition parameters can be taken to include a reference to article type, article location, article status, article use history, article identity and history log. Throughout the specification a reference to account or user account can be taken to include a reference to log in criteria, establishment of a user identity and registration.

In its broadest form the present invention comprises:
an electronic tracking and activity monitoring system for capturing and storing activity of a plurality of articles held in a security panel assembly capable of tracking and recording movements relative to the panel assembly of at least one article supported by the panel assembly; the panel assembly comprising; a panel body having a first outer side and a second outer side defining a space therebetween; the panel body capable of receiving and retaining the at least one article supported therein via at least one said first and second outer sides; and located in the space between the outer first and second sides, an electronics panel including at least one reader to allow said tracking and recording of movement of said at least one security article when the article is moved relative to the panel assembly; the system including a user activated application which interacts with electronics in the security panel assembly to enable a plurality of users to track activity of a plurality of security articles.

According to one embodiment the panel assembly is manufactured in two parts which combine in opposing relationship to form the space therebetween. Preferably each panel part is manufactured from a moulded plastics material an includes a plurality of openings which receive and retain the articles stored by the panel assembly. Preferred each opening in the first and second panel parts comprises an elongated slot which receives and retains an RFID tag or the like which provides an identity for each article.

According to a preferred embodiment the electronics panel comprises a printed circuit board which includes at least one aerial each located to create separate detection fields. Preferably each elongated slot located in one detection field to ensure that a reader in the circuit board relates one slot to at least one article identity. According to an alternative embodiment, there is one aerial located at an entry point to the panel assembly. According to one embodiment the article stored on the panel assembly is a key which includes an identity tag such that when the key is moved from or returned to a selected slot the history of movement is retained by the reader. The application enables a user to open and close the panel assembly, track the history of use of each article, link the article to a machine and monitor use of articles by other users.

According to a preferred embodiment the article is a key and includes an RFID tag or similar electronic identity or signature which identifies the key. According to one embodiment the RFID tag is capable of releasable locking engagement and disengagement with the panel assembly to avoid unwanted key separation in the event of carriage of the panel by a user. According to one embodiment each panel has elongated slots which provide a key path to home positions for each key on the panel. Since each key has an identity or key signature the electronic reader will record activity of each identified key. In one embodiment an application is used by a potentially unlimited number of users to access data concerning keys, accessing a use history log, accessing real time activity of keys and accessing data concerning another user's key use activity.

In another broad form the present invention comprises:
a method for user activated tracking and recording movement of at least one article having a unique identity and which are retained in a security cabinet having at least one panel assembly therein for retaining said articles; an electronics panel including at least one reader to allow said tracking and recording of movement of said at least one article when the article is moved relative to the panel assembly; and a user device including an enabling application to enable user interaction with said articles; the method comprising the steps of;
a) storing the identity and location of each said at last one article in a data base accessible by a user, upon user activation of an application operable via a user device,
b) activating the user application via the user device to unlock access to said articles and data related to each article and establish communication with a data base related to the identity of said articles;
c) selecting at least one article and determining at least one condition parameter of the at least one article;
d) based on the at least one condition parameters electing use or non use of the at least one article.

According to one embodiment the user after establishing an account, removes the article from the panel whereupon the a server records the selected article and the activity of the article, including location tracking and tracking return of the article to the cabinet housing the panels. The application allows a user to check other user's use activity for any of the articles and enables an electronic reader to receive and store data relative to tag movement and location.

Once user interaction is established, the data base can be accessed and updated indicative of the movements of the key between a location on the panel and a remote location off the panel.

According to a preferred embodiment the panel comprises; a panel body having a first outer side and a second outer side defining a space therebetween; the panel body capable of receiving and retaining at least one article supported therein via at least one said first and second outer sides; and located in the panel assembly.

According to a preferred embodiment, the electronics panel is a PC Board. Preferably the at least one electronics panel includes a two way aerial capable of reading tag movement when inserted into or removed from the panel; security cabinet includes walls and a door defining an internal space in which is placed at least one panel assembly capable of tracking and recording movement of articles stored in or on the panel and having an identity tag which is retained in the panel assembly.

Each panel assembly comprises; a panel body having a first outer side and a second outer side defining a space therebetween; the panel body capable of receiving and retaining the at least one article supported therein via at least one said first and second outer sides; and associated with the panel between the outer first and second sides, an electronics panel including at least one reader to allow said tracking and recording of movement of said at least one article when the article is moved relative to the panel assembly; the security cabinet having an identity reader which identifies an individual gaining access to a panel assembly in the cabinet and stores data relating to said access.

In another broad form the present invention comprises: a portable panel assembly comprising; a panel body having a first outer side and a second outer side defining a space therebetween; the panel body capable of receiving and retaining the at least one article supported therein via at least one said first and second outer sides; and associated with the panel between the outer first and second sides, an electronics panel including at least one reader to allow said tracking and recording of movement of said at least one article when the article is moved relative to the panel assembly; the security cabinet having an identity reader which identifies an individual article gaining access to a panel assembly in a cabinet and stores use and movement data relating to the article; wherein the assembly is activated via a user application installed in a user device.

According to a preferred embodiment there is provided a computer application which is retained in a user device which allows input of user access criteria to determine whether a user is allowed access to, remove or insert an article into the panel. According to one embodiment each article is a key which is attached to an electronic tag.

The present invention provides improvement in and an alternative to the known prior art and the shortcomings identified. The foregoing and other objects and advantages will appear from the description to follow. In the description reference is made to the accompanying representations, which forms a part hereof, and in which is shown by way of illustration specific embodiments in which the invention may be practiced. These embodiments will be described in sufficient detail to enable those skilled in the art to practice the invention, and it is to be understood that other embodiments may be utilised and that structural changes may be made without departing from the scope of the invention. The following detailed description is, therefore, not to be taken in a limiting sense, and the scope of the present invention is best defined by the broader statement of invention.

BRIEF DESCRIPTION OF DRAWINGS

The present invention will now be described in more detail according to a preferred but non limiting embodiment and with reference to the accompanying drawings wherein;

FIG. 1 shows a perspective view of a security cabinet with a panel assembly located therein according to a preferred embodiment;

FIG. 2 shows an abbreviated front elevation view of the security cabinet of FIG. 1;

FIG. 3 shows an abbreviated side elevation view of the security cabinet of FIG. 1;

FIG. 4 shows a top/plan view of the security cabinet of FIG. 1;

FIG. 12 shows the front perspective view of the panel assembly with a key at the location of an electronic reader urged along the key path.

FIG. 13 shows an enlarged view of the electronic reader of FIG. 12 with a key at the location of an electronic reader urged along the key path.

FIG. 32 illustrates schematically a subset of the overview of FIG. 29 and indicating cabinet access protocols.

DETAILED DESCRIPTION

Figure 6:
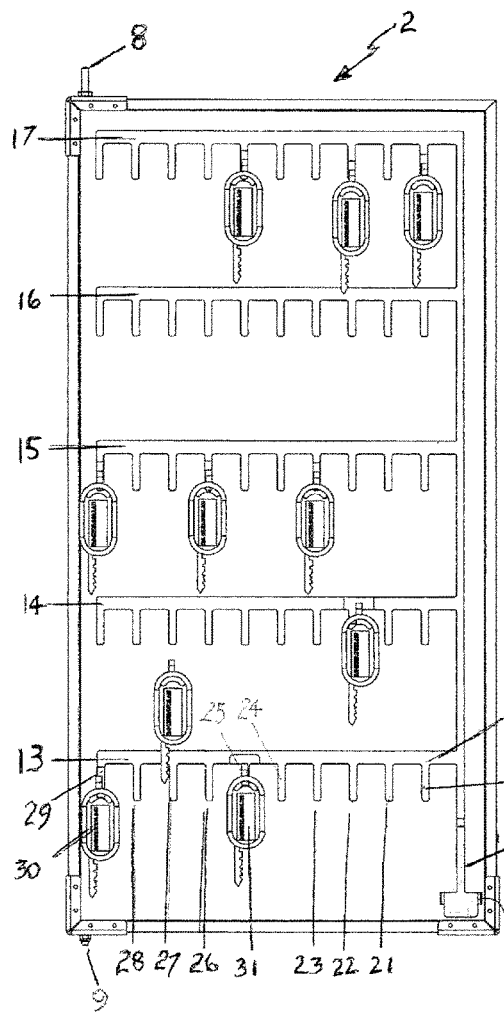
FIG. 6 shows a front elevation view of the extracted panel assembly of FIG. 5.

The examples referred to herein are illustrative and are not to be regarded as limiting the scope of the invention. While various embodiments of the invention have been described herein, it will be appreciated that these are capable of modification, and therefore the disclosures herein are not to be construed as limiting of the precise details set forth, but to avail such changes and alterations as fall within the purview of the description. Although the method and apparatus aspects of the invention will be described with reference to their application to the embodiments described it will be appreciated that the invention can be embodied in alternative panel assemblies.

FIG. 1 shows a security cabinet 1 with a panel assembly 2 located therein according to one embodiment. Cabinet 1 comprises a housing 3 defining an internal space 4 in which panel 2 locates. Housing 3 can be sized to accommodate a plurality of like panel assemblies. Connected to housing 3 is a lockable door 5 which allows restricted access to panel 2. Cabinet 1 preferably includes a security lock which tracks access to the cabinet by recording and checking user identity data. This may be achieved using a user application or key pad which allows interaction by authorised users. Panel 2 can be extracted from cabinet 1 to allow a user to carry the panel 2 to a remote location where tracked articles such as but not limited to keys are required. The articles may comprise, articles such as but not limited to keys, drugs security devices and other articles which require tracking. A user can therefore carry a full panel of articles such as keys as required. The ability to extract panel 2 from cabinet 1 allows the user an option of selecting individual keys from panel 2 or taking the whole panel assembly 2 from the cabinet. This capacity to remove panel assembly 2 is particularly useful in high key usage environments such as but not limited to car yards, hospitals, universities, schools, clubs, hotels, motels, clubs, shopping centres and the like. In addition to a locking assembly 6 on door 5 which is capable of tracking user identity and recording user operation of and access to the cabinet 1, panel assembly 2 also includes tracking electronics and recording data to be described in more detail below.

FIG. 2 shows with corresponding numbering a front elevation view of the security cabinet of FIG. 1 including keys 2a. Cabinet 1 further comprises a digital code lock 7 which allows a user to perform such actions as open a user account, unlock, gain access. The digital code lock 7 receives a unique code or number which opens a user account or triggers video surveillance In an alternative embodiment the function of lock seven may be performed by a user controlled application contained on an electronic device such as a mobile phone, ipad, tablet, computer, smart phone. FIG. 3 shows with corresponding numbering a side elevation view of the security cabinet 1 of FIG. 1. FIG. 4 shows a top/plan view of the security cabinet of FIG. 1.

Figure 5:
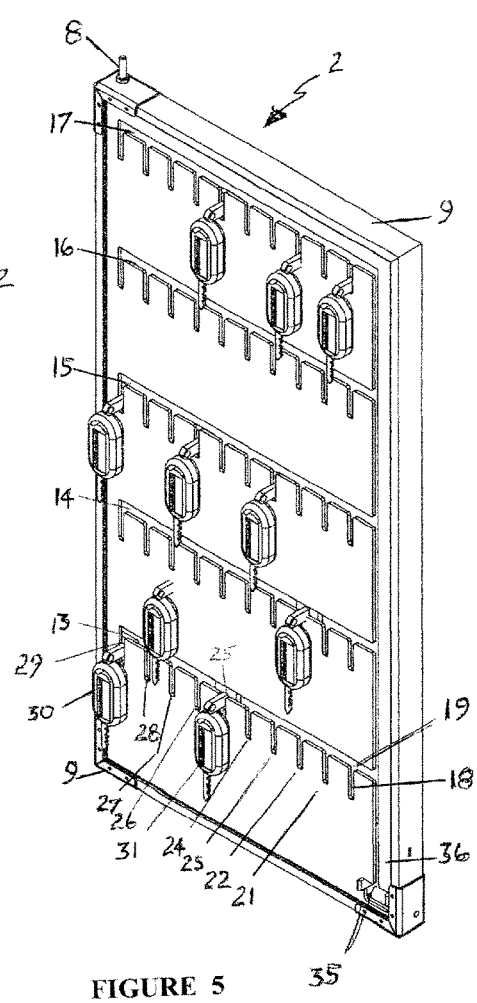
FIG. 5 shows a perspective view of a panel assembly and mounting brackets isolated from the security cabinet in FIG. 1.

FIG. 5 shows a perspective view of the panel assembly 2 isolated from cabinet 3 and including mounting brackets 8 and 9. Panel assembly 2 is capable of tracking and recording movements of articles supported by the panel assembly 2 by communication with a user application. Although the articles which are tracked by the panel 2 can include keys and various other articles such as drugs, guns, valuables and other articles requiring security, the invention will primarily be described with reference to key security. This provides security for businesses and organisations which have high key usage. Panel assembly 2 comprises a panel body 9 having a first outer side 10 and a second outer side 11 defining an internal space 12 therebetween. Panel body 9 is capable of receiving and retaining a plurality of keys in a series of key slots. As shown in FIG. 5 there are plurality of rows of key slots, 13, 14, 15, 16 and 17. The rows can be either staggered or in alignment as shown in FIG. 6. Key slots in row 13 vertically align with the key slots in row 14. Each key slot is identical. Each key slot 18 has a shape which receives a key tag assembly and allows locking of the key tag in the slot. Slot 18 comprises an opening 19 which is large enough to initially receive part of an RFID tag assembly 20 (to be described in more detail below). RFID tag assembly 20 is secured in slot 18.

Figure 7:
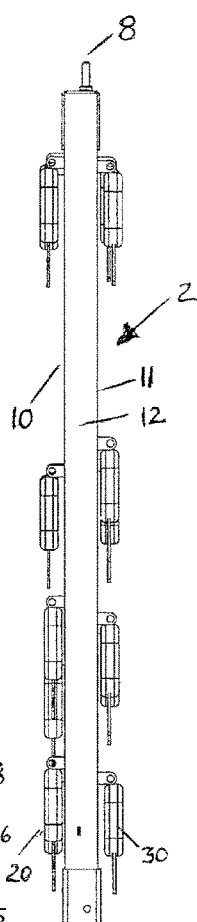
FIG. 7 shows a side elevation view of the panel assembly of FIG. 5 according to an alternative embodiment.

FIG. 6 shows with corresponding numbering a front elevation view of the extracted panel assembly 2 of FIG. 5. As shown row 13 includes slots 18, 21, 22, 23, 24 and 25. Slots 29 and 25 hold keys 30 and 31 respectively. FIG. 7 shows a side elevation view of the panel assembly 2 of FIG. 5. As shown in FIG. 6, panel 2 further comprises a key 35 near an electronic reader 36.

Figure 8:
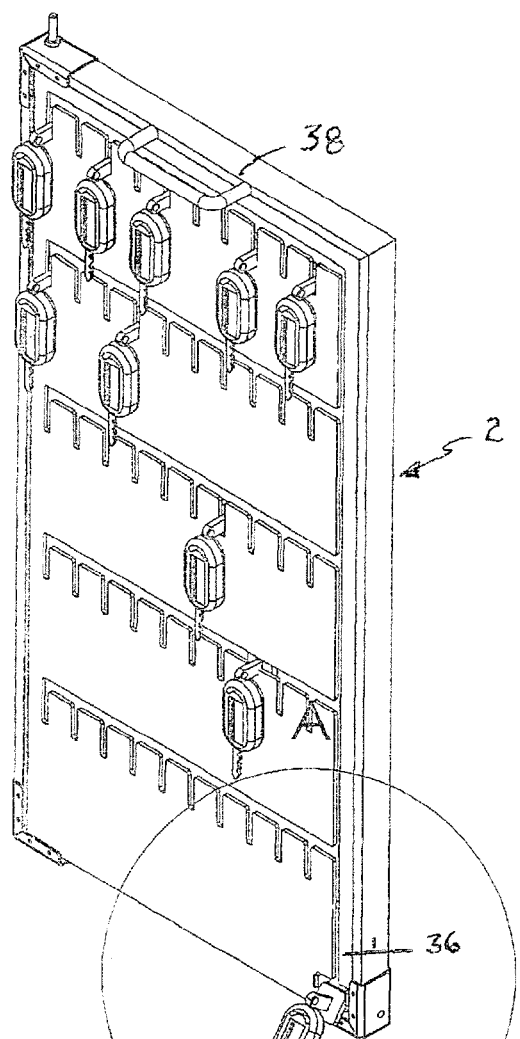
FIG. 8 shows a front perspective view of the panel assembly with a key at the location of an electronic reader.
Figure 9:
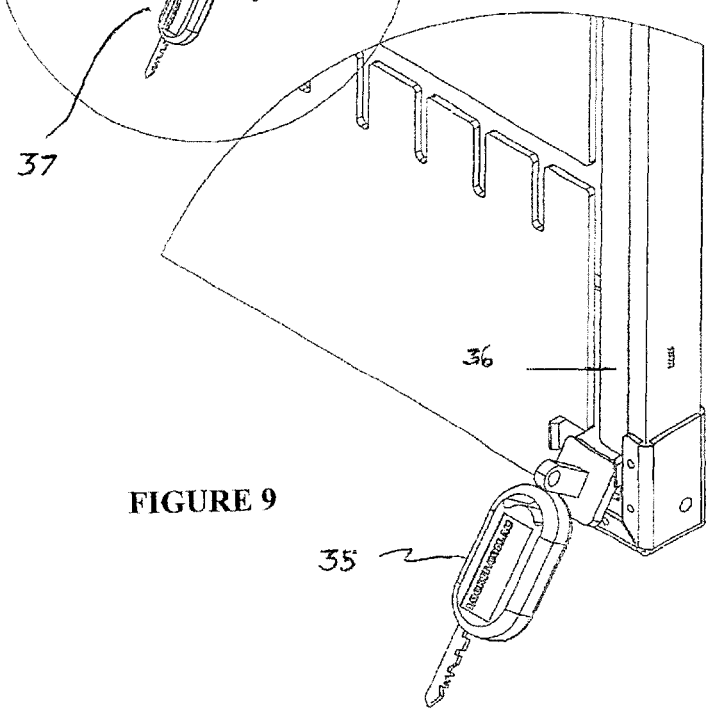
FIG. 9 shows an enlarged view of the electronic reader of FIG. 8.
Figures 10, 11:
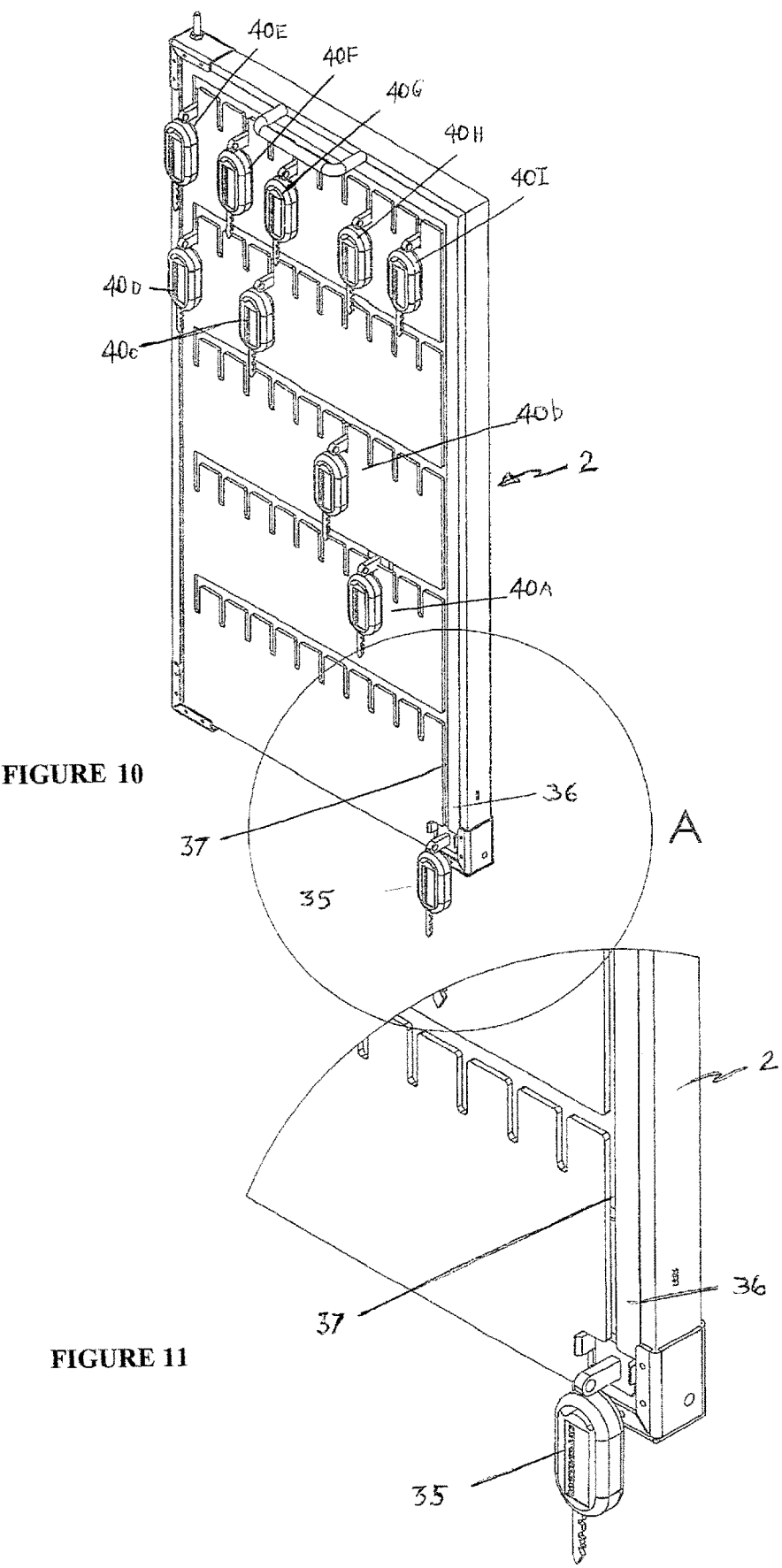
FIG. 10 shows the front perspective view of the panel assembly with a key at the location of an electronic reader with key fully inserted.
FIG. 11 shows an enlarged view of the electronic reader of FIG. 10 with a key at the location of an electronic reader with key fully inserted.

FIG. 8 shows a front perspective view of the panel assembly 2 with a key 37 partially inserted at the location of an electronic reader 36 just prior to insertion. Panel 2 includes a handle 38 which allows removal and transportation of the panel 2 with all keys FIG. 9 shows an enlarged view of the key 35 partially inserted and presented to electronic reader 36 electronic reader of FIG. 8. FIG. 10 shows the front perspective view of the panel assembly 2 with key 35 the location of an electronic reader 36 and fully inserted. Panel 2 includes a plurality of like keys 40a, 40b, 40c, 40d, 40e, 40f, 40g, 40h and 40I each in a home position.

FIG. 11 shows an enlarged view of the electronic reader of FIG. 8 with a key at the location of an electronic reader 36 and fully inserted in key path 37. FIG. 12 shows with corresponding numbering, the front perspective view of the panel assembly 2 with key 35 at the location of an electronic reader 36 urged along the key path. FIG. 13 shows an enlarged view of the electronic reader 36 of FIG. 8 with a key 35 at the location of an electronic reader 36 urged along the key path 37.

Figure 14:
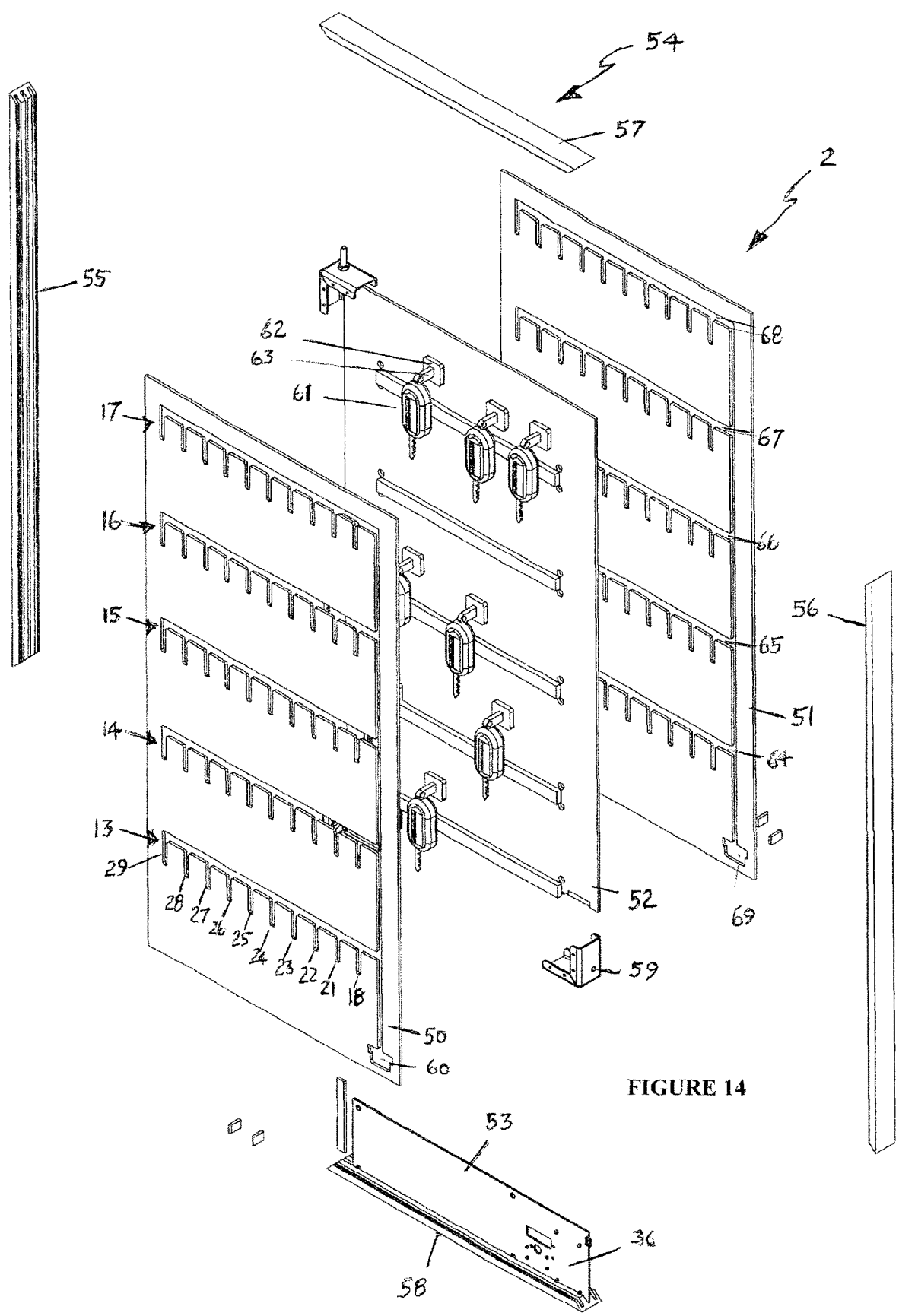
FIG. 14 shows an exploded view of the panel assembly of FIG. 12.

FIG. 14 shows with corresponding numbering an exploded view of the panel assembly 2 of FIG. 5. As shown in FIG. 14 panel assembly 2 comprises a first moulded part 50 and second moulded part 51. Parts 50 and 51 co operate to form a housing in which is located an electronic board 52. Panel 2 further comprises a PC board 53 which includes an aerial in addition to RFID tag reader 36. Electronic board 52 is protected by sandwich panels 50 and 51 which contain individually identifiable slots which receive articles to be held such as keys. When assembled together, panels 50, 15 and 52 are retained by a peripheral frame 54 (see FIG. 12) comprising side members 55 and 56 and top and bottom frame members 57 and 58 respectively. According to a preferred embodiment, frame members are typically engaged via a connection bracket at the corners. For example, bottom member 58 engages side member 56 via corner bracket. A similar arrangement may be adopted for each corner. Panel 50 includes an opening 60 which provides an entry and exit point for RFID key tags. Although panel 50 show a particular configuration of tag slots, it will be appreciated by persons skilled in the art that other configurations are feasible according to design requirements and according to the type of article being stored in the panel assembly 2.

As shown row 13 includes slots 18, 21, 22, 23, 24, 25, 26, 27, 28 and 29. This indicates the available paths in row 13 for a tag inserted in opening 60. Likewise rows 14-17 provide a plurality of alternative home locations for the electronic key tags 62. Panel 52 shows an array of tags 62 which are connected to keys 61. Each tag has a support member 63 which receives and supports keys 61. Panel 51 includes rows 64, 65, 66, 67, and 68 which allows tags to be inserted via opening 69 on the opposite side of panel 52. Once assembled the panel 2 can be removed from cabinet 3 and transported with all of its tags to remote locations which can be tracked and recorded by the sensors and readers.

Figure 15:
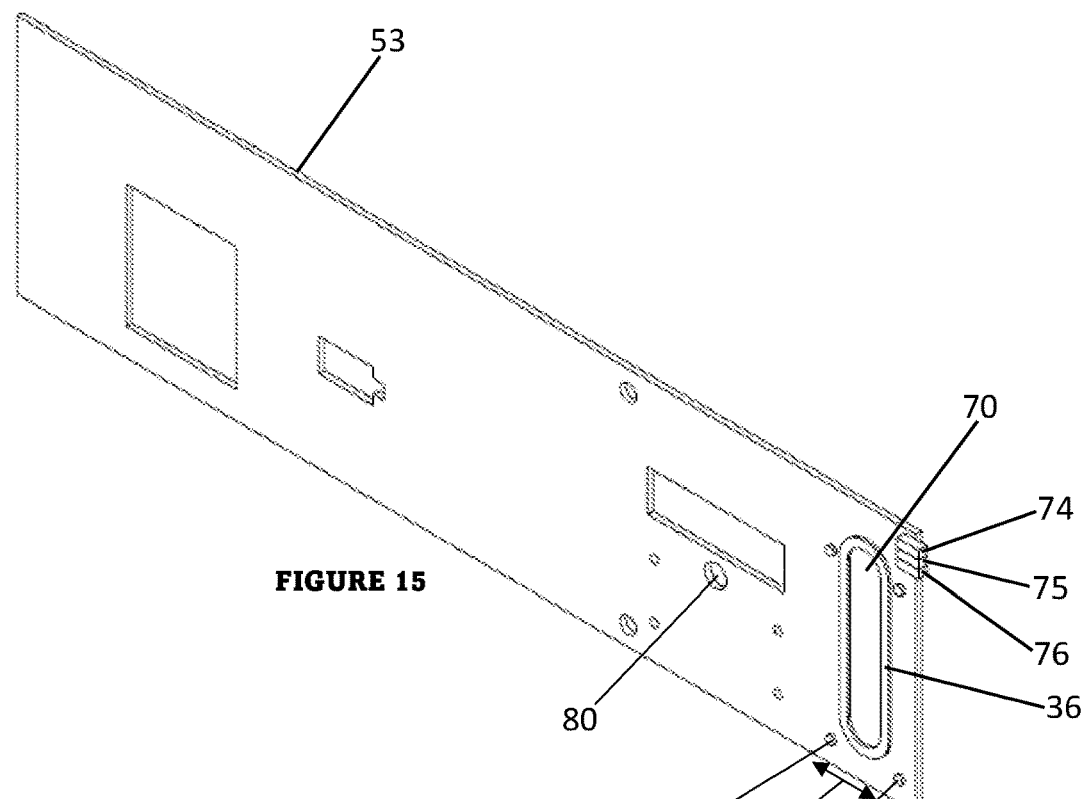
FIG. 15 shows a perspective enlarged view of a PC board according to one embodiment.
Figure 16:
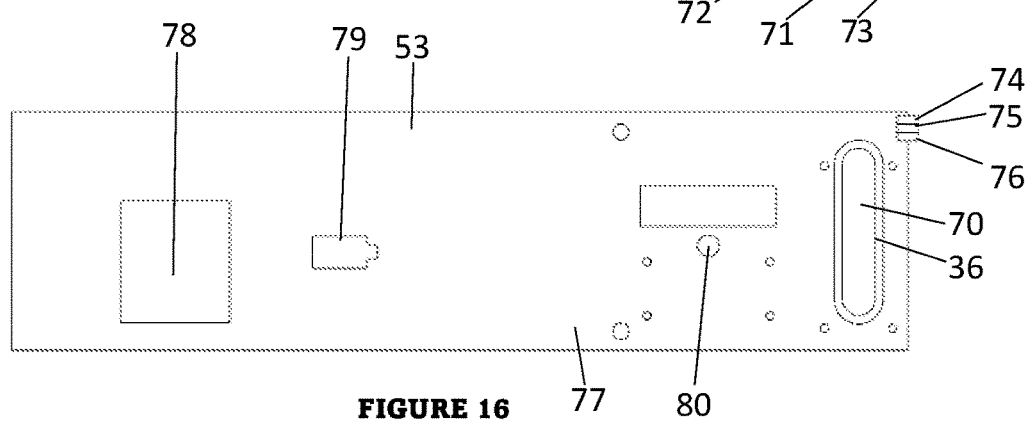
FIG. 16 shows an enlarged front elevation view of the PC board of FIG. 14.
Figure 17:
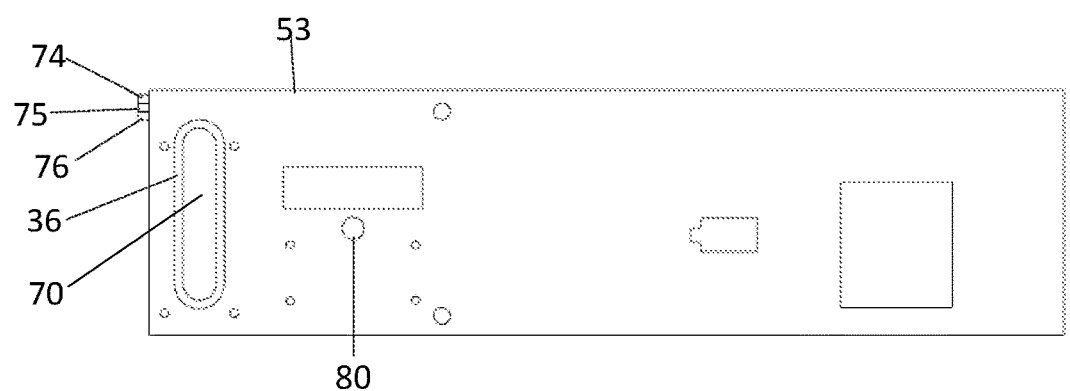
FIG. 17 shows an enlarged back elevation view of the PC board of FIG. 14.

FIG. 15 shows a perspective enlarged view of a PC board 53 according to one embodiment. FIG. 16 shows with corresponding numbering an enlarged front elevation view of the PC board of FIG. 15. FIG. 17 shows with corresponding numbering an enlarged back elevation view of the PC board 53 of FIG. 15.

PCB board 53 allows tracking and recording of movement of an article placed in each slot in which the article is moved relative to the panel assembly 2. Parts 50 and 51 of panel assembly 2 according to one embodiment are manufactured in two co-operating halves which combine in opposing relationship to form the space therebetween which receives PCB board 53 and panels 51 and 52. Preferably each panel part is manufactured from a moulded plastics material.

Preferably, each panel 2 is adapted with 1 PC board 53 within each frame. Power is provided at the top and bottom of the panel 2 via wires which travel through panel 2 and terminate at the PC board 53. PC board 53 includes an aerial 70 associated with a reader 36 as described earlier. Aerial 70 is two sided in that it is active on each side of the PC board 53 so that tags entering openings 60 and 69 for location on respective panels 50 and 51 are detected. Aerila location and number may be varied according to particular requirements. Thus, both sides of the PC board share the same aerial. There is provided an incoming tag gate indicated by arrow 71 comprising a Photo electric beam created from co-operating sources 72 and 73. The photo electric beam 71 detects a tag as it enters from a keyboard frame. Board 53 further comprises tag traffic light indicators 74, 75 and 76 which indicate user conditions such as but not limited to acceptance or rejection of a tag. For example a red light may indicate rejection of entry or rejection of removal of a tag. The lights (preferably red, orange or green) can be set up individually or in combination to indicate a variety of user states and conditions as required.

When a tag is to be removed from panel 2 it is tracked by the user who will have entered a user account identifier via a key pad. If the tag removal is approved, the traffic lights will indicate that the key can be released via the reader. Similarly when an article tag is to be replaced, the tag is presented to the reader and if the tag is recognised and approved, a green light will allow entry to panel 2. According to one embodiment the PC board is fitted with a gate control motor 80 for restricting removal or insertion/replacement of a tag. This will allow restriction of removal of insertion of an unapproved tag. This might for instance occur when a user account is not recognised or the tag is not recognised as part of the article inventory for the particular panel. In a further embodiment, the PC board is fitted with an audio alert 77 which alerts a user to a condition or event status. A battery 78 is provided which provides power to the PC board 53 when panel 2 has been removed from cabinet 3.

According to one embodiment, there is provided a WiFi connection 79 which allows primary communications with a remote computer to allow tracking of tag movements and event status.

Figures 18, 19:
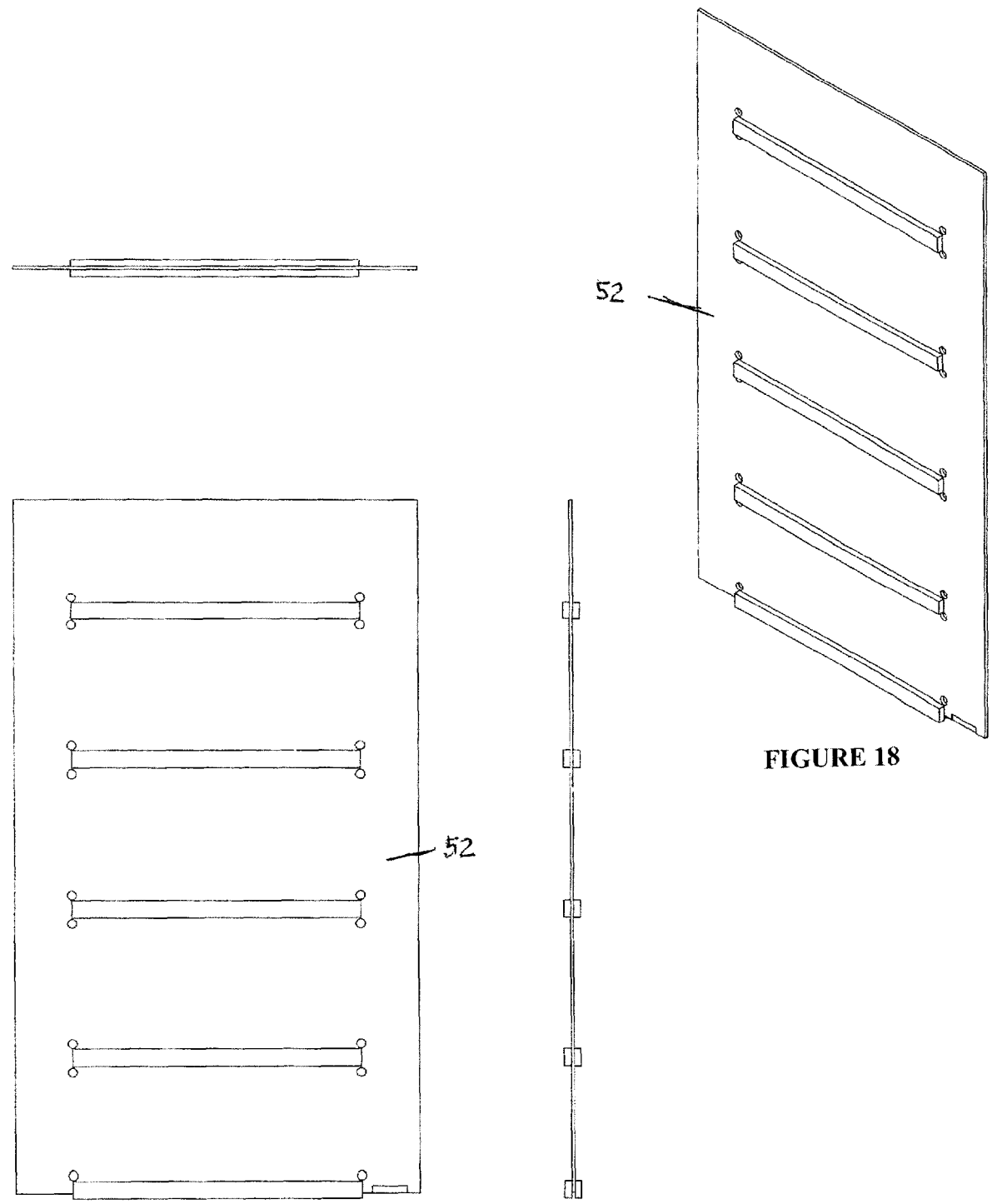
FIG. 18 shows a perspective view of a central panel isolated from the panel assembly of FIG. 14.
FIG. 19 shows a front elevation of the central panel of FIG. 14.
Figure 20:
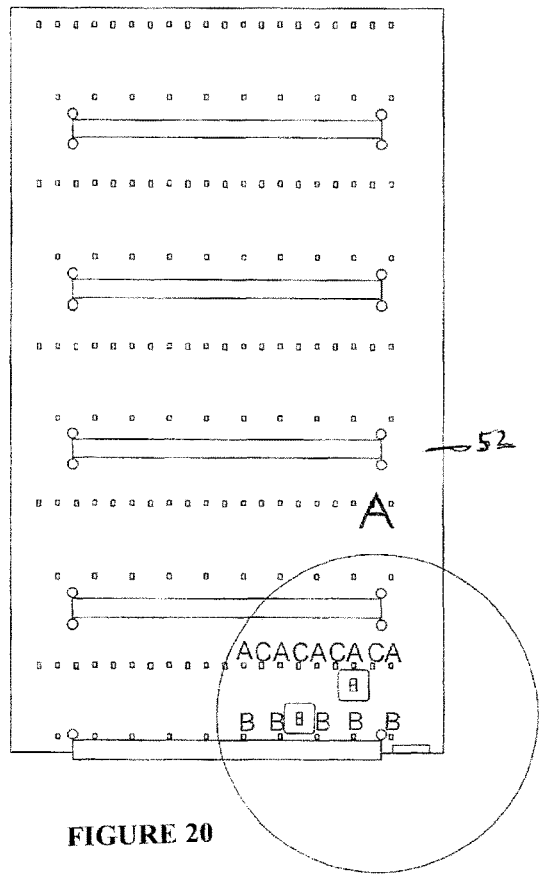
FIG. 20 shows an elevation view of an electronics panel indicating sources of electronic beams.
Figure 22:
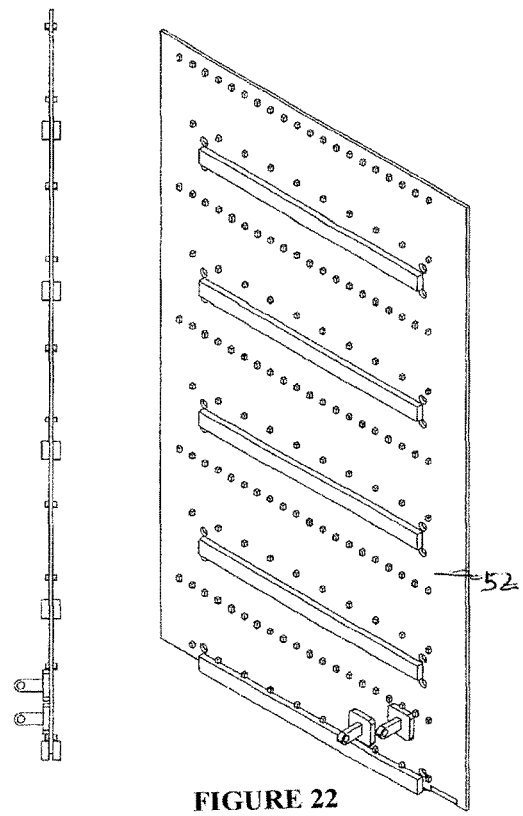
FIG. 22 shows a perspective view of the panel of FIG. 20.
Figure 21:
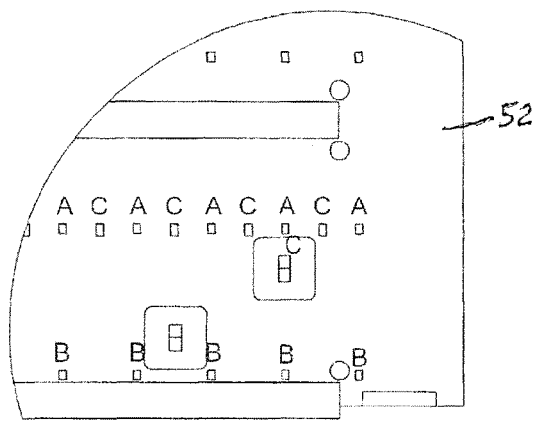
FIG. 21 shows an enlarged view of the panel of FIG. 20.

FIG. 18 shows a perspective view of a central panel 52 isolated from the panel assembly 2 of FIG. 12. FIG. 19 shows a front elevation of the central panel 52 of FIG. 16. FIG. 20 shows an elevation view of an electronics panel indicating sources of electronic beams. FIG. 21 shows an enlarged view of the panel 52 of FIG. 18. FIG. 22 shows a perspective view of the panel 52 of FIG. 20.

FIG. 21 shows with corresponding numbering, an enlarged front elevation of the electronics panel assembly 52 including electronics. The circuit panel is according to one embodiment made up of a series of separate but co operating sensors which are joined to each other via circuitry. Panel 52 includes power input ports which activate PCB electronics including the aerial and reader. Letters A and B represent photo electric beams so that when a tag reach a particular location on the panel 52 it may remain in that location until a user retrieves it and takes the panel out. During return or removal of the PE beams the location of each tag is monitored. The electronics on panel 52 (and panel 51—see FIG. 14) can be adapted with a variety of photoelectric beam arrangements which allow tracking according to a tracking regime setup for each panel. Thus tracking parameters can be adjusted according to the particular requirements of the data and movement history required. Panel assembly 2 remains active when removed from cabinet 3 powered by battery so that tracking data and movement of the location of the article stored in the panels can be saved. In an alternative embodiment the panel can be integrated with a GPS tracking system and monitoring can occur within the panel or remotely.

A microprocessor is provided at an edge of circuit panel which receives, stores and processes read data when an RFID tag is introduced into a slot. The enabling software can be programmed to read individual openings or groups of openings. For example a row of slots can be predetermined as one grouping. This might be helpful in a case where a group of keys in a row are for a particular purpose and a group in another row are for another purpose. For example in a school keys to toiles might be on one row and keys to the classrooms might be another row. Thus the aerials and readers can be arranged according to individual user requirements. Preferably there is provided one reader and one aerial/antenna per slot in the panel. The RFID tags can be read by the reader and the data written/stored. Antennas are connected to each panel module. On entry of a key mounting assembly into a slot in the panel, a photoelectric beam is broken which activates the dedicated aerial which then reads the RFID tag to identify the key. If a key is placed in an incorrect slot an alarm alerts a user to the mismatch between the aerial for a particular slot and the rfid tag. Software allows programming of an aerial to a key identity.

Figures 23, 24:
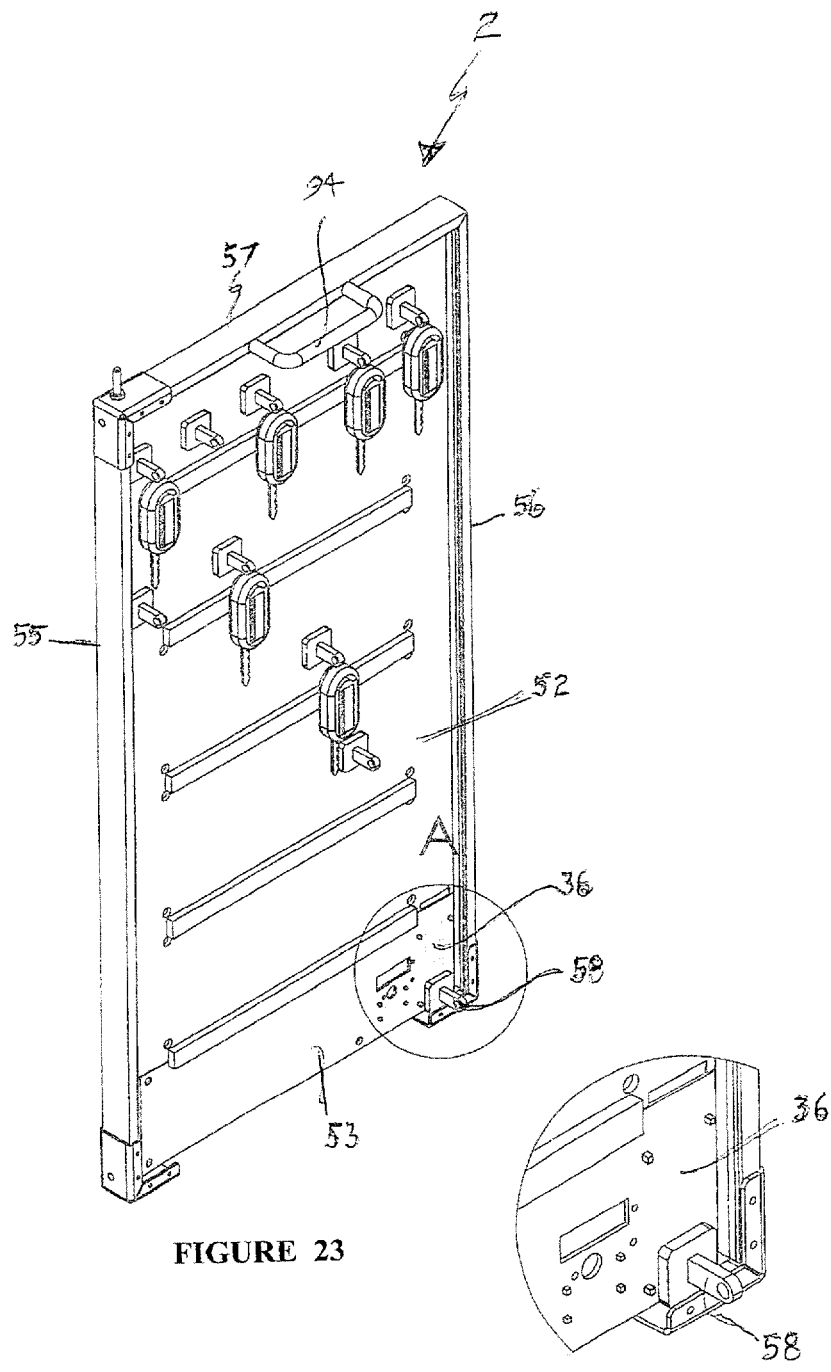
FIG. 23 shows a perspective view of the panel assembly of FIG. 12 with front panel isolated.
FIG. 24 shows an enlarged view of the key engagement with the reader of FIG. 20.

FIG. 23 shows with corresponding numbering a perspective view of the panel assembly of FIG. 12 partially assembled but with panel 50 removed for clarity and exposing panel 52. Rfid tag 58 is shown near electronic reader 36. FIG. 24 shows an enlarged view of the key engagement with the reader 36 of FIG. 20. Panel 52 when added will conceal each of the rfid tags as described previously.

A data base created by the software allows a determination of a variety of key activity parameters. Activity parameters include position of the key—i.e. the slot that the key is in, the identity of the person using the key, position and movement activity of the key, tracking of the key, photograph of the key. The software is also able to set the aerial field to restrict size of a detection zone. The software also controls the tuning capacity of the aerial to set and determine the output of the reader so that false reads are avoided. The circuit modules each have at least one antenna, a switch, a reader, a power source and integrated circuitry. According to one embodiment, each interconnected module has a micro processor which includes the reader and the controller LED's are optionally included to illuminate the slots. According to one embodiment a coloured light system allows the user to understand a user control status. For example a red light status can indicate that user access to the keys is denied. An Orange beam can indicate that a key is on stand by and a green or white light indicates that keys are available.

Each antenna used whether one or multiple, is equipped with a switch tuned to a specific power ratio to enable identification of a particular RFID tag and avoid cross reading of a wrong tag. A re chargeable battery is located in a housing in the panel assembly.

Figure 25:
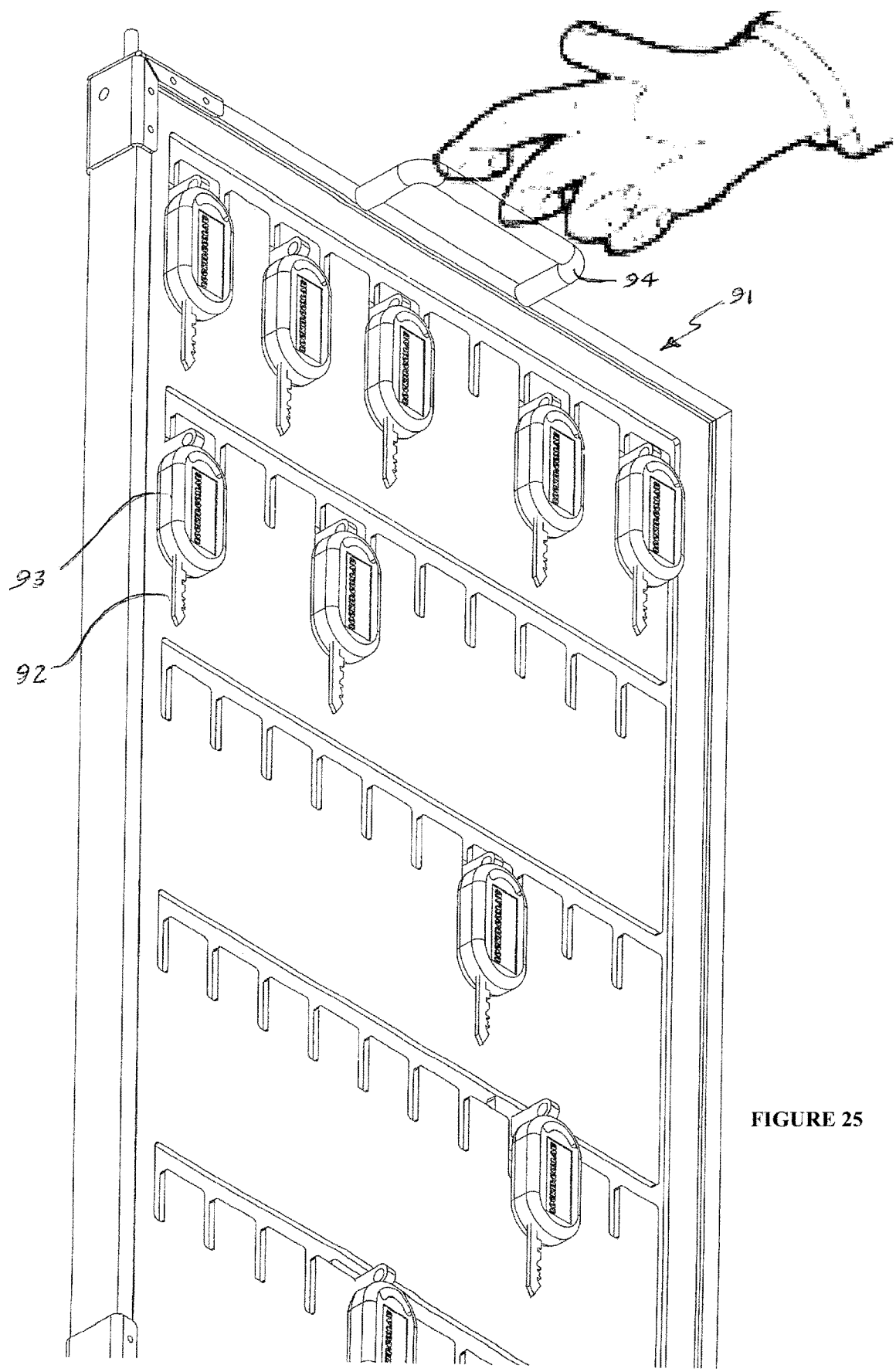
FIG. 25 shows a perspective view of atypical panel including an arrays of keys and demonstrating a carry handle for portability.

FIG. 25 shows a perspective view of atypical panel 91 including an arrays of keys 92 connected to tags 93 and demonstrating a carry handle 94 for portability.

Figure 26:
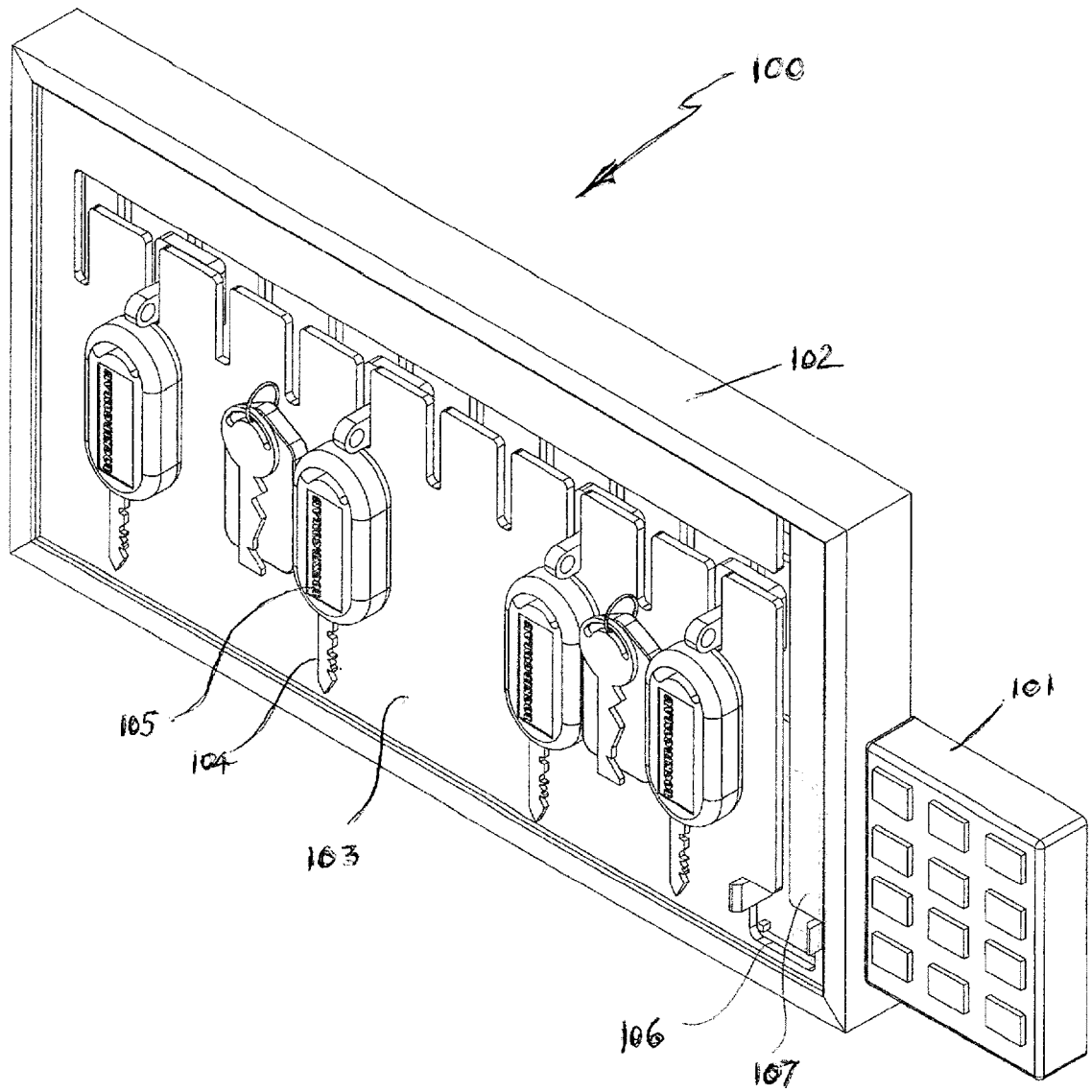
FIG. 26 shows an abbreviated panel assembly including an electronic operating pad according to an alternative embodiment.

FIG. 26 shows an abbreviated panel assembly 100 including an electronic operating data input pad 101. As described earlier, the function of the data input pad in allowing authorised user access, may be effected by use of a computer app contained in a portable electronic device. Assembly 100 is essentially a smaller version of the larger panel assembly 2 described earlier with reference to FIG. 5. Assembly 100 includes a frame 102 which retains slotted panel 103. Panel 103 retains keys 104 connected to electronic tags 105. Assembly 100 further comprises access opening 106 which is associated with reader 107.

Figure 27:
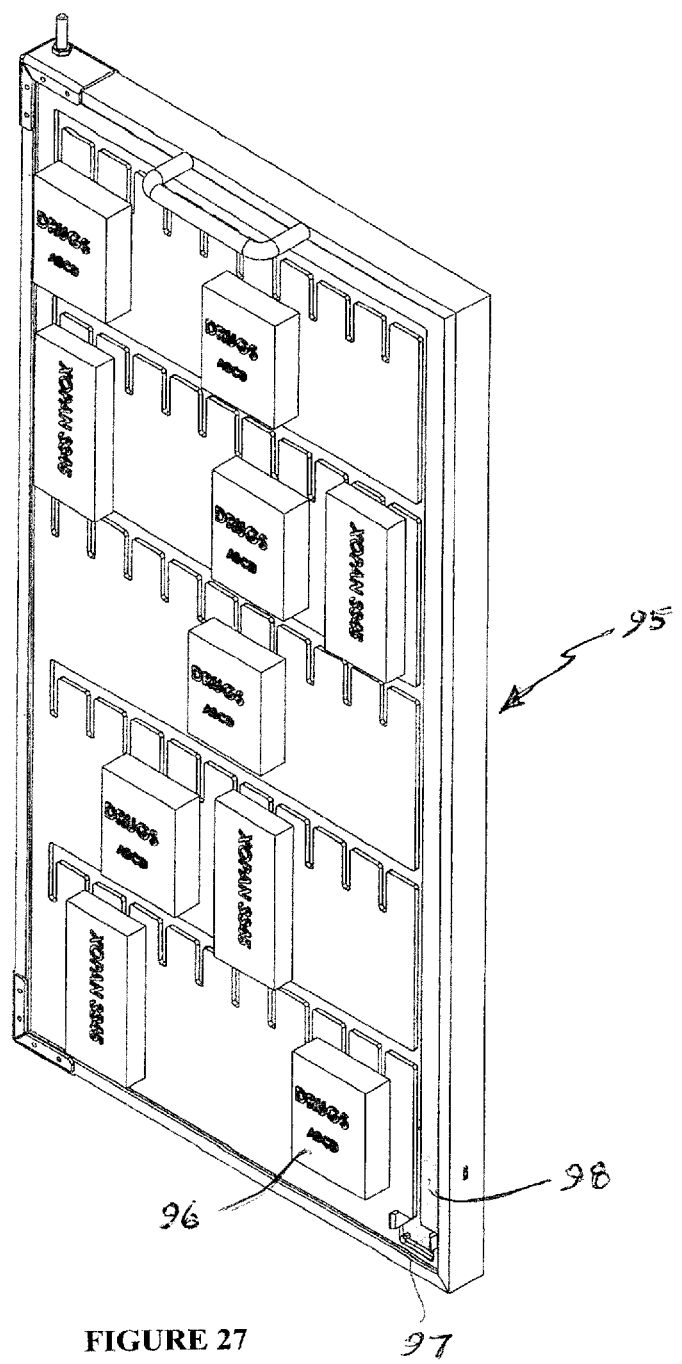
FIG. 27 shows a perspective view of a panel assembly according to an alternative embodiment, accommodating drugs.
Figure 28A:
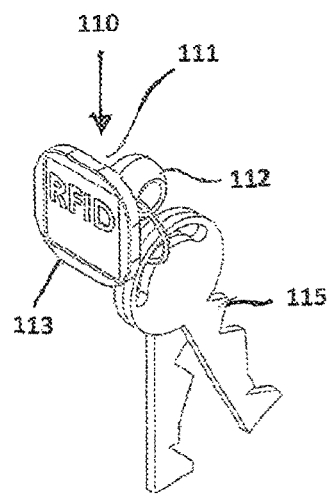
FIGS. 28a-g shows various views of an RFID tag associated with keys and which engages the panel assembly.
Figure 28B:
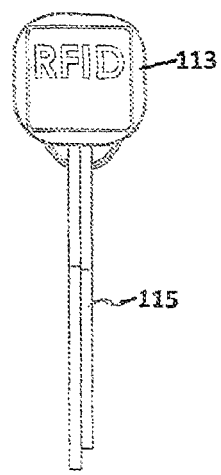
Figure 28C:
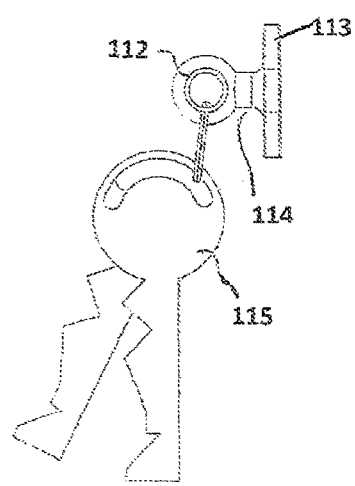
Figure 28D:
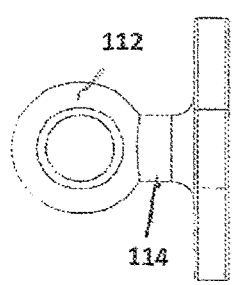
Figure 28E:
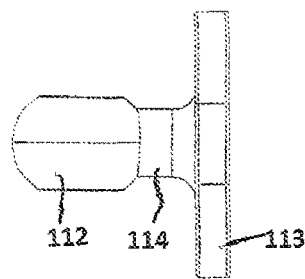
Figure 28F:
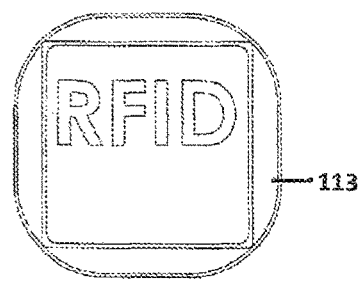
Figure 28G:
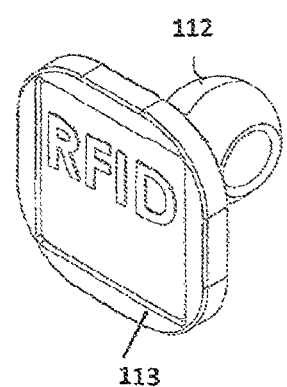

FIG. 27 shows a perspective view of a panel assembly 95 according to an alternative embodiment wherein the article requiring protection form the security cabinet is a drug 96. This arrangement has similar electronic characteristics as those described earlier and is particularly useful in hospitals, nursing homes and other institutions which require tracking of article such as drugs and stores the data locally or at a remote location. Drugs are fed through location point 97 past reader 98 and the tracking data is logged in the manner described earlier.

FIGS. 285*a-g* show various views of an RFID tag assembly 110 which in use engages the panel assembly 2. Tag assembly 110 comprises a body 111 which terminates at one end in a key ring 112. At opposite end of body 111 is an electronic tag 113 which engages via guide flange member 114 slots in panel 2 as previously described. Body 111 can be selectively pulled in a direction away from the panel 2, to either engage the panel or release the key assembly 115. This allows a user to selectively engage a particular location within a slot. According to a preferred embodiment the RFID tag 110 is selectively released and inserted into slots on panel 2. RFID tag 110 can be read and movement data recorded in the central processor. According to one embodiment each elongated slot is capable of retaining more than one key such that with the key identity the reader will record activity of each identified key. Formations on the slots in panel 2 accommodate the corresponding formations on assembly 110.

According to this embodiment the article stored on the panel assembly is a key which includes an identity (such as the RFID tag 110) such that when the key 115 is moved from or returned to a selected slot the history of movement is retained by the reader. According to a preferred embodiment an electronics panel comprises a printed circuit board which includes aerials each located to create one or separate detection fields as described earlier. According to a preferred embodiment there is one aerial. When an RFID tag assembly is used, this can accommodate one key or a plurality of keys. Thus one RFID tag can track one key or multiple keys—i.e. a set or bunch of keys.

According to one embodiment, each panel 50 and 51 which are included in panel assembly 2 are manufactured from a plastics mould such that each part can be manufactured in the same mould. Alternatively separate moulds can be created for each part if different characteristics are required for each side of a panel. The parts are moulded to accurately accommodate the electronics panel 52 securing it in a space inside the panel. Each slot in the panel has an opening to accommodate a correspondingly shaped engaging flange of a tag assembly which is then able to drop into the slot for secure attachment. Each slot can be arranged and programmed to recognise activity of more than one key. As shown in the embodiments described earlier up to three keys can be accommodated in those slots. Slots can be elongated to accommodate more than three keys or shortened to accommodate one key. One aerial can be used for multiple keys. Alternatively one aerial can be provided for each key. Where three or more keys are used these can be simultaneously readable.

According to one embodiment there are up to 450 keys per cabinet. Typically a cabinet can hold at least two panels of keys. Smaller panels are envisaged which accommodate a smaller number of keys but operate along the same lines as described for panel 2. A tag slot location number system is applied to the PC board so to identify each of the key locations. Preferably the aerial is designed to have a face of the Key tag RFID just 2 to 3 mm away from the aerial plane. Panel 2 is removable from cabinet and is supported by battery power for a period of time. When a panel is removed from cabinet 1 as described with reference to FIGS. 2 and 3, a storage battery 78 allows tag reading and data recording when panels are isolated from the main power source. Once the panel is returned to its location a download of remotely read data can commence to update the processor with data collected when the panel was in temporary remote use.

According to one embodiment each RFID tag includes means to enable illumination of the tag in response to a location sensor or the like. This enables a user to identify when the tag is in its home position. In this arrangement the key panel may also illuminate when the RFID tag reaches its home position. Each RFID can include an auxiliary data tag including a unique bar code or other unique identifier, details of the vehicle whose key is identified, including VIN number, make, model and colour.

In addition to the hardware and electronic aspects described herein, there is further provided an interactive computer application which allows users to communicate with other users. Keys are highly mobile in dealerships and valuable time is lost looking for keys. Keys can be mislaid or simply lost in many ways. Vehicles can be unknowingly moved to different parking locations without the knowledge of the management. Many hours are lost to NOT knowing which staff or if keys have been secured in other locations. Proprietors must Keep keys constantly secure when in cabinets or with when staff have access. They must know who had keys when traffic offences on vehicle occurs, know where keys and vehicle stock is located 'live'.

Accordingly, one aspect of the present invention comprises a method of monitoring in real time the activity of keys or other articles in high key usage environments. More particularly there is provided a computer application which is downloadable for users and which can be integrated into the central controller. Each user has a downloadable software application (app), which is adapted to any known electronic device including mobile devices such as iPads, I phones, tablets, personal computers and the like.

The App, communicates with a central controller typically located at a key station and also communicates with other users app's to allow tracking of articles an a security cabinet, handover of responsibility to another user (such as may occur in a car yard) and transfer to another user when for instance a vehicle key is handed to another user. The app allows a user to gain access to key cabinets—locking and unlocking. Preferably, the app has access to real time data related to tracking, possession, location, tracking history of articles for which the app is adapted. A user can at any time gain access to information on tracking of keys in the hands of any user, match keys with remote vehicles, match keys with remote locks. In another embodiment the security cabinet can be adapted for use with dangerous articles such as guns and drugs so that their use can be electronically tracked and history logged and so any authorised person may use a control centre or enabling app to track history of use.

New vehicle locking technologies have influenced key management and vehicle Immobilisers have been a mandatory since July 2000. Immobilisers have changed the way vehicles are secured placing higher reliance on the operating key for security. This has made the vehicle key the necessary target for security infringements. Opportunity theft represents more than 90% of dealership vehicle theft. Poor key security breeds ongoing 'easy theft' attitude towards dealerships, service & vehicle storage.

Vehicle keys can cost from $250.00 to $1500.00. If there are 100 keys in a storage location, this could total $60,000.00 worth of key hardware. Adding the cost of 24 hour security to protect vehicles, reprogramming & rekeying, business interruption and loss of business, the costs may exceed $100,000.00 without a vehicle being stolen. In 1999—some 200-400 vehicles were stolen from dealerships in Australia. Key security is therefore desirable to eliminate such losses. Key cabinets have contributed to an overall drop in improper access to keys and the opportunity to steal them. Key cabinets are the first line security defence in environments.

According to one embodiment of the invention described herein, there is provided electronic monitoring of key tags for monitoring and tracking particularly though not limited to environments if high key usage such as in car yards, car hire businesses an any fleet environment. The present invention according to one embodiment, integrates electronic tracking at a home station (or via a remote controller) with user activated downloadable applications which enhances security.

The electronic tracking and monitoring system and associated hardware includes a key storage cabinet or panel, electronics associated with the panel which allows removal of the panel but retention of electronic security data related to the articles held in the panel, a central controller, an electronic key tag and a user controlled app to communicate with a central controller and other users. The system contemplated allows users to: determine key location prior to insertion into the cabinet, open a cabinet using an iphone or other suitable electronic device to retrieve/obtain key/s, determine a prior user in possession, its location, finding a current (real time) user and where a vehicle associated with that vehicle's key is parked.

Figure 29:
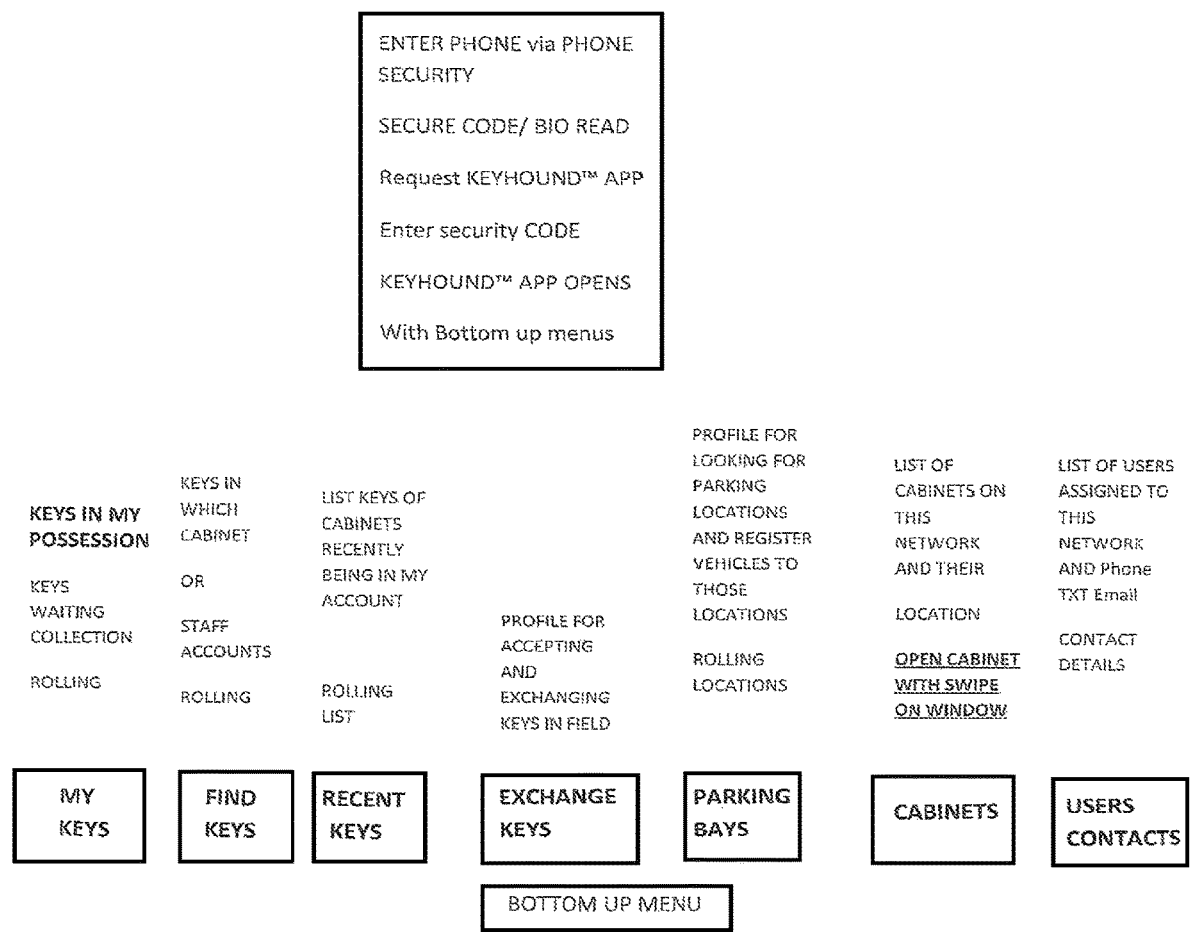
FIG. 29 sets out the menus for user history, finding key location, listing of recent user key activities, user key exchanges with other users, vehicle parking history, cabinets in a particular network and user contacts.

FIG. 29 provides a schematic overview of the electronic monitoring and key management system referring to log in and App activation steps and the sample range of actions which a user can adopt. In particular FIG. 29 sets out schematically the menus for user history, finding key location, listing of recent user key activities, user key exchanges with other users, vehicle parking history, cabinets in a particular network and user contacts.

Preferably, the system adopts RFID—Radio Frequency Identification; NFC—Near Frequency Communication and BLE—Bluetooth Low Energy and a software application (app). The app allows management of the tracking control and monitoring system and more particularly allows tracking of key movement history from removal from a storage location through all uses remote from the storage location and from user to user and back to the storage location. This enables close tracking of staff and other personnel access to keys, where a particular key for a particular vehicle is at any time. For example, a user may access the App to determine where a particular key to a particular vehicle is with respect to its precise location generally and when located in the storage cabinet, For example a particular key may be for example, in Slot 5 level 1 or location 65 on a keyboard panel No. 2, A side. The app is also used not only to monitor the key activity histories but also to activate a key access request from individual users.

Example

Accessing Keys

The following is an example of one use regime for operation of the tracking system as per the schematics of FIG. 29. User's menu options include: keys under current control of user, keys to be found, recent key activity, exchanging keys in the field, matching parking locations with keys, selecting a security cabinet from all cabinets on a particular network and lists of users on a network and their contact details. A user uses the app to request collection of a key. This triggers a time period (such as 3 minutes) at the end of which the cabinet is ready to 'read' a user's phone.

A user then places the phone against the key storage cabinet or panel which unlocks a door or gated access to the key in the cabinet. Upon opening of the cabinet, the users 'account' is open and the user may select and remove at least one key up to as many keys are required by the user. For example if a user is an employee of a car yard, that employee can remove multiple keys all of which are tracked to that user's account so that any other person (at least a second user) requiring any of those keys will know by using their App that the keys have been taken to another location by the first user. Thus if for example three keys are removed by the first user, the first users account will show those three keys removed and the second user will upon accessing the storage cabinet, be alerted to the removal of the keys by the first user. This method allows a potentially unlimited number of participants to access the security system and in real time determine the location of keys, use history and which user has custody of them.

Example

Returning Keys

A user requests OPEN CABINET and places the phone against a cabinet body. This triggers unlocking of the door. The user then inserted keys to be returned into an entry slot in a panel of the cabinet. Keys are returned to their correct location in the via an entry gate. Once the cabinet detects return of the keys by passing through the entry gate and to their home locations, the user's account is altered to show the change of key custody to the storage cabinet. The returned keys are added to the data base of the cabinet which allows a subsequent user to access returned keys. The user's account and cabinet account are updated to show the real time status of the keys locations and history. Returned keys are removed from a user's account and placed on the key cabinets account.

Example

In Field Key Exchange

Figure 30:
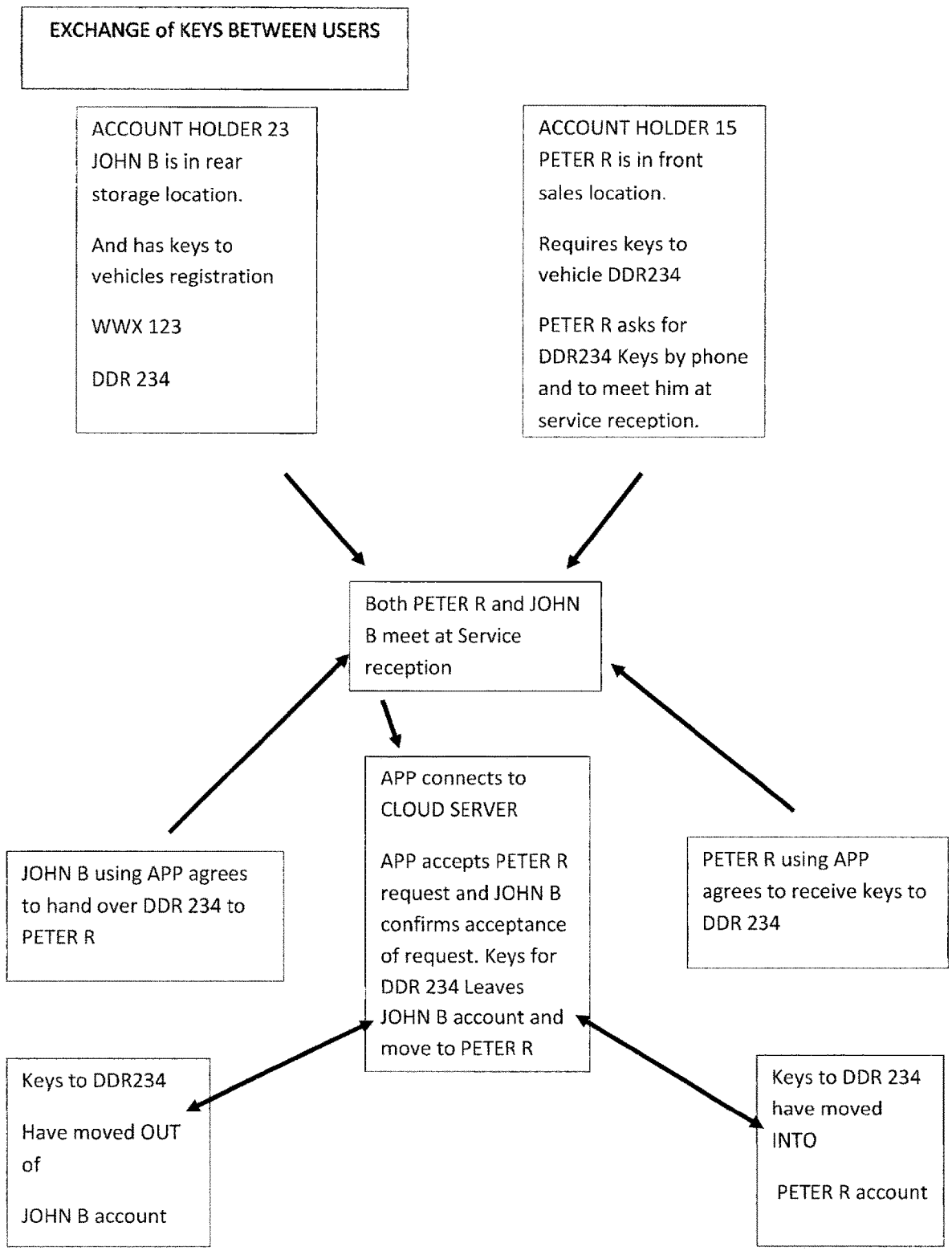
FIG. 30 illustrates schematically a series of steps in facilitating key exchanges between users.

FIG. 30 is a subset menu of FIG. 29 illustrates schematically a series of steps in facilitating key exchanges between users. This occurs where remote users may wish to exchange keys without returning the keys to the 'home' storage location. A user—say user A (account holder 23)—actives the user app and logs in. An enquiry is made for the whereabouts of a particular key. For example the user may enquire as to the location of key to vehicle registration LXC 39E. The central controller communicates with the app to advise the enquirer that the key is located with another user—say user B (account holder 15). User B can be advised of user A's phone contact number to allow user A and user B to arrange a key exchange. If user B has allowed the controller to release contact details the display on user A's phone allows him to activate contact to user B. user A and user B can either arrange to meet direct to re track the key custody via their respective apps or they may elect to do the key exchange via the security cabinet where the key is stored.

Example

Finding a Key Location at the Storage Cabinet

Figure 31:
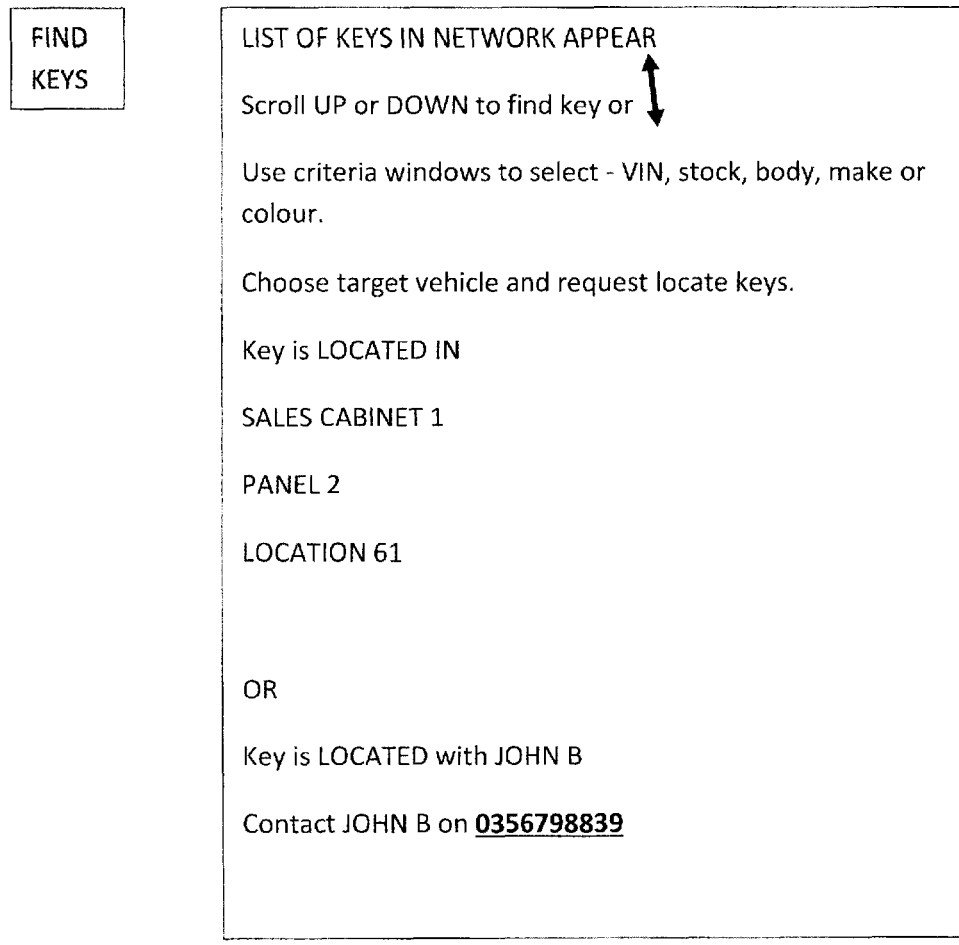
FIG. 31 sets out schematic series of steps in facilitating finding location of keys, including searching for keys via other system users.

FIG. 31 is a subset menu of FIG. 29 and sets out schematic series of steps in facilitating finding location of keys, including searching for keys via other system users. This occurs when a remote user wishes to determine the location of a vehicle key within a storage cabinet. A user logs in and inputs the registration number of a vehicle or other identifying parameters, for which the key location is required. The App accesses the real time current location data and advises the user that the key is in a location identified by for example, cabinet number, panel side, slot in the panel. The App can also match the key requested with the vehicle location—such as parking bay FIG. 32 illustrates schematically a subset of the overview of FIG. 29 and indicating cabinet access protocols. A user approaches a cabinet with a device including an enabling app, such as but not limited to an iphone. The app includes a staff key list or any other data base information related to keys and personnel. A user approaches a cabinet to open the cabinet with the iphone. A cabinet is selected form the cabinets available in the network. The iphone is placed in proximity to the cabinet selected—eg cabinet A, B, C, D, etc. The cabinet is unlocked by the user A key list is illuminated for removal by staff and/or keys are removed as required.

Example

Using System to Move a Vehicle from One Bay to Another

A staff member collects a vehicle key from a key cabinet and on his phone views the 'Parking Bay' field that the vehicle is in . . . say bay H5. The staff member collects vehicle from . . . bay 1-15 and relocates the vehicle to another parking bay parking bay—say G16. The staff member enters the new location G16 into the 'Parking Bay' field on the member's user's App as he or she exits the vehicle. This bay number G16 is then updated into the key's 'Parking Bay' details.

Reporting Opportunities

A range of pre designed Excel spread sheet based reports are available. Also available are Custom reports tuned to client needs, TXT reports for late returns, TXT emergency reports for alarms, regular email reports, cabinet to phone/tablet drop reports, Real Estate key management; keys details such as key brand or use (front door, Back door, windows Etc.) are group or individually photographed and logged on the 'Key's account register'. This allows staff to validate the keys sets against the keys recorded.

When staff remove keys from the storage cabinet, keys are transferred to staff account. Staff can then transfer the key to a $3^{rd}$ person via 'field transfer' facility as described earlier.

Real Estate Environment—Tenant and Trades Persons Key Tracking

Other applications of the electronic tracking system include Keys for rental and "property for sale" which can be held in the cabinet. As keys are handed to tenants the key location is tracked to the tenant.

During property maintenance a tradesman may require a key to a property. For example, an Electrician requires keys to 15 Brent St to do maintenance repairs. A Real Estate staff member with keys (on their account) is able to conduct an over the counter 'field transfer' of the key to the Electrician and sets return time at 4 pm (if late return TXT is sent to Electrician phone). When keys are returned, Staff can review keys against photo images to ensure all keys are accounted for. A field transfer' from electrician to staff occurs. The staff member returns keys to cabinet and the key account is returned to the cabinet.

Real Estate Environment—Removing key from Cabinet—

The user logs into the electronic system. The user makes an enquiry as to the whereabouts of a key to a particular address of a property on their data base. A typical enquiry would be—Where is the key to 23 Korgie St. Burwood? Via an app or by direct access to the key cabinet controller, the user receives a response to the request for location of the property key data. A location is provided for the property at the identified address. E.g.—23 Korgie St. is on keyboard 1 side A location 32. In a similar manner to that described earlier, a user makes a collection request which triggers a response time interval. This may for instance be 3 minutes. The user places the phone against the cabinet door which results in unlocking of the cabinet door or gate. When the user opens the cabinet, the users and cabinet account/data base is also open. The user can then access and remove any number of keys required. Each key removed will be referable to an address of a property which is managed. For instance if three keys are removed the data base will show the three addresses which are liked to those keys.

Example

Property Management Managing Building/Institution Keys

Building managers are responsible for building security and usually control large numbers of keys. This may occur in educational institutions such as schools, universities and colleges of advanced and further education.

Example

Multiple Site/Building Keys Can be Held in the Cabinet

Key's details such as key location (e.g Science main building door, individual Room keys, Etc.) are grouped or individually photographed and logged on the 'Key's account register'. When an employee removes keys from a key cabinet, each set of keys is transferred to employee's account. For example, if a cleaner requires keys for a particular location in a building (e.g. a room on level 3 of the science building), the cleaner enters their unique code for their access to a cabinet. Upon entry of the that code the cabinet opens and the cleaner can remove the building entry key and the room entry key. That removal is recorded. When the keys are returned to the key cabinet, the tracking is updated to reflect in the cabinet's history of logged data, the new home location for the returned keys, whereupon the data is changed from the employees account to the house or cabinet account.

According to one embodiment the cabinet has a locking gate including a stop pin which engages a key tag to limit travel of the tag either in or out until access criteria have been satisfied. The stop pin is preferably operated via an electric driver to move in and out blocking or opening the key tag access tracks in a cabinet or panel with in the cabinet.

In use, to retrieve a key from the cabinet, a key tag is moved down the exit track and is stopped from entering the entry/removal area by the locking gate pin. If tag is permitted to exit, the pin is retracted and the tag drops into the entry/removal area. The Pin is returned to the locking position after the tag is removed. When a key is returned to the storage cabinet, the identity tag is moved into entry/removal opening and is initially prevented from entering the entry track by an extended pin. If a tag is correct as determined by a reader or other gate entry device, the pin retracts and the tag can now travel the entry track to the desired predetermined tag parking location.

Various additional actions are enabled by the tag entry/removal system associated with the storage cabinet. For example an electronic tag can be programmed to be security controlled and as required restricted by either Tag security levels or staff access levels. Authorised tags can be removed and returned in which case the gate pin will respectively retract allowing removal of the tag and return to tis locked mode when key removal or return activity has completed. In a case where a tag is security protected and an attempt is made to remove it, the gate pin will NOT retract and an alarm may sound and or a TXT and/or email generated to alter management to unauthorised key tag removal. In a similar manner a tag wrongly placed into the entry/removal area will not retract the gate pin. An alarm may sound and or a TXT and or email generated to alert management of an unauthorised or incorrect tag.

Tag Control—Traffic Light Status Indications

Also envisaged is a key traffic light indicating and control system which provides a visual status to users of key activity. As tags enter or exit a key panel, a set of monitoring traffic lights show the status of the tag entry/exit. For example, using conventional indicators: a RED light will indicate—waiting for tag exit/return; AMBER will indicate—reading tag waiting for confirmation; and GREEN indicates removal or access of keys allowed.

The electronic key monitoring system described is integrated with the hardware equipment comprising key support panels housed in a security cabinet. The electronics may be included in the individual panels and/or in a cabinet. When in the panels this allows panel removal and with each panel there exists a data recorder which allows data logging and updating when a panel is returned to its home location (usually within a cabinet).

Cabinet access is enabled by use of a mobile phone having a downloadable application which allows direct communications with access electronics which authorises or refuses key access, or remote communication which allows remote key transfer and data logging and also interrogation of central data storage. Alternatively access is via external use of an RIFD tag on an external reader. According to one embodiment, logged activity data which is stored at a central data storage location can be uploaded into the 'could' for remote access. Keys may typically be identified by various parameters including but not limited to vehicle yin number, stock number, make, model and colour. The stat management system allows real time and historical data on individual key activity and by extension individual vehicle activity.

The management system allows various levels of user operation which are adaptable to user and business requirements for each installation. In a first level there is provided an RFID tag which allows access to a specific cabinet. A second level allows the facility of level 1 but also allows access to vehicle keys stored in a variety of cabinets, registration of vehicle locations and changes of locations and remote exchange and recording of key exchanges between users/employees. In a third level of operation the first and second operational activities are available but in addition allows a platform of interactive user operations including updating or correction of key identity and activity data, transmissions and receipt of user notifications, text and email communications (downloads and uploads) to users with real time updates and status reports. This third level facility also allows oversight of key cabinets, employee key use and tracking activity, reporting on system status and upgrades of user software and applications.

Use of System for Removing Identified Vehicle from Stacked Parking.

Another example of use of the system according to the invention relates to circumstances of stacked parking when vehicles are parked in by other vehicles such as occurs in car yards, parking stations, vehicles services centres. When a car that is parked in requires retrieval, other vehicles need removing to clear a path for the vehicle required. if an operator has no knowledge of which blocking cars require removal to retrieve the car required, this can be a time consuming process. To move any vehicle, keys for any blocking vehicles need to be obtained to allow clearing the blocking vehicle and retrieve the 'target vehicle'.

Staff working these areas are required to establish the 'target vehicle's' location and the vehicles blocking the removal of the 'target vehicle'. This requires an allocation of time and often keys are not where they should be as other users have them in their possession. Included in the data base and control centre is historical data concerning the key activity of all vehicles concerned. Specifically the control centre is able to track which vehicle or vehicles are blocking one or more other vehicles so an operator can using the recorded data and signalling by the system, determine remotely which keys will be required to effect removal of the vehicle including those keys required for moving the blocking vehicles.

The system provides parking station layouts and is capable of recording vehicle locations so keys can be tracked to that location by a user when interrogating the system for key data. Included in the data will be parking locations of vehicles which block other vehicles and matching of keys to specific locations. The intelligent key cabinet has a 'field' cell area in the 'App' where an authorised user can type in the parking location of a vehicle as it is being parked. As vehicles are moved around the 'Stacked Parking' area the various users can enter changes to the vehicle parking locations as they occur. This allows continuous vehicle tracking. Preferably the parking yard is assigned a grid layout such as may be identified by letter and numbered rows as shown in FIG. 33.

Figure 33:
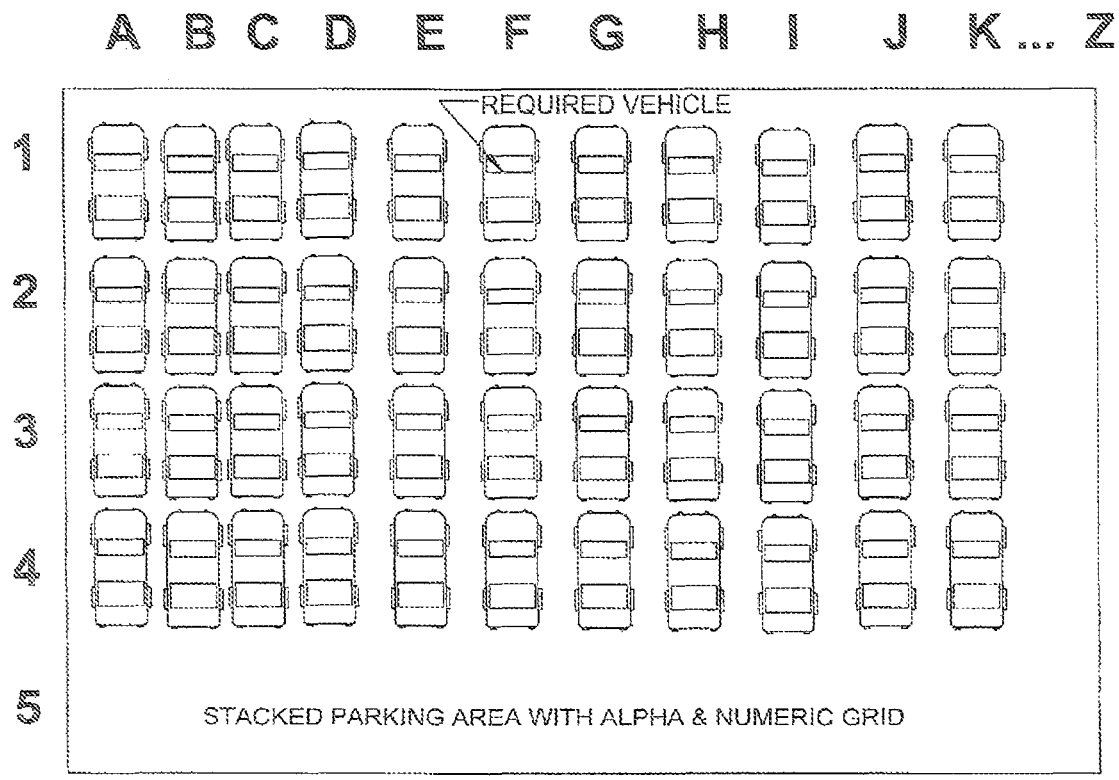
FIG. 33 shows a grid layout for use in matching keys to vehicle whose location is identified by the grid position.

In the example FIG. 33 the site is laid out in a way a user can visually check the Letter Row and Number Row as there are written elevated signs that can be seen when the user looks around the site. Once a user establishes the grid position where this vehicle is now parked, in this case 1F, the user updates the Intelligent cabinets 'Vehicle parking' via the App. In this example 44 vehicles are shown in a grid ranging from 1 A through to 4 K. This grid can be bigger or smaller depending on the parking site size. Other types of reference can be used ranging from single named vehicle parking locations or multi-level parking locations. The Intelligent cabinet is pre-programmed with the 'Vehicle spaces' within the grid or 'single spaces are recorded to be allocated as required. A vehicle grid can be formed by keys registered to this 'parking location'.

When a user wants to find a vehicle and where it is parked the user device (computer, ipad, iPhone, tablet or the like) advises both key location in the cabinet and the parking location on the parking grid. This allows the user to quickly retrieve the keys and know the parking location of the target vehicle.

Figure 34:
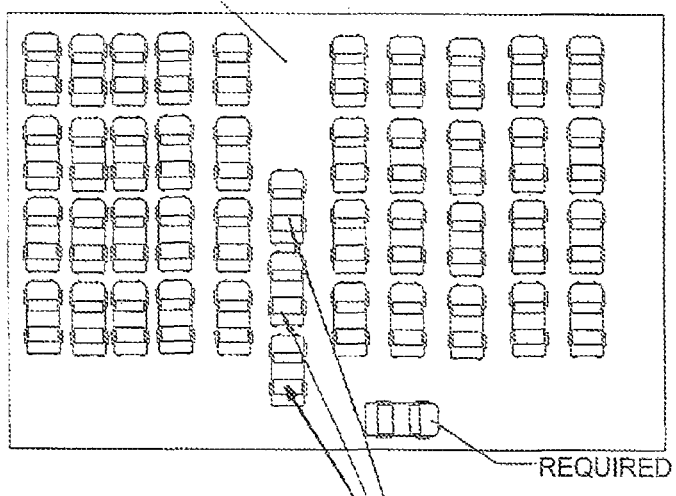
FIG. 34 shows vehicles that must be removed to retrieve the target vehicle.
Figure 35:
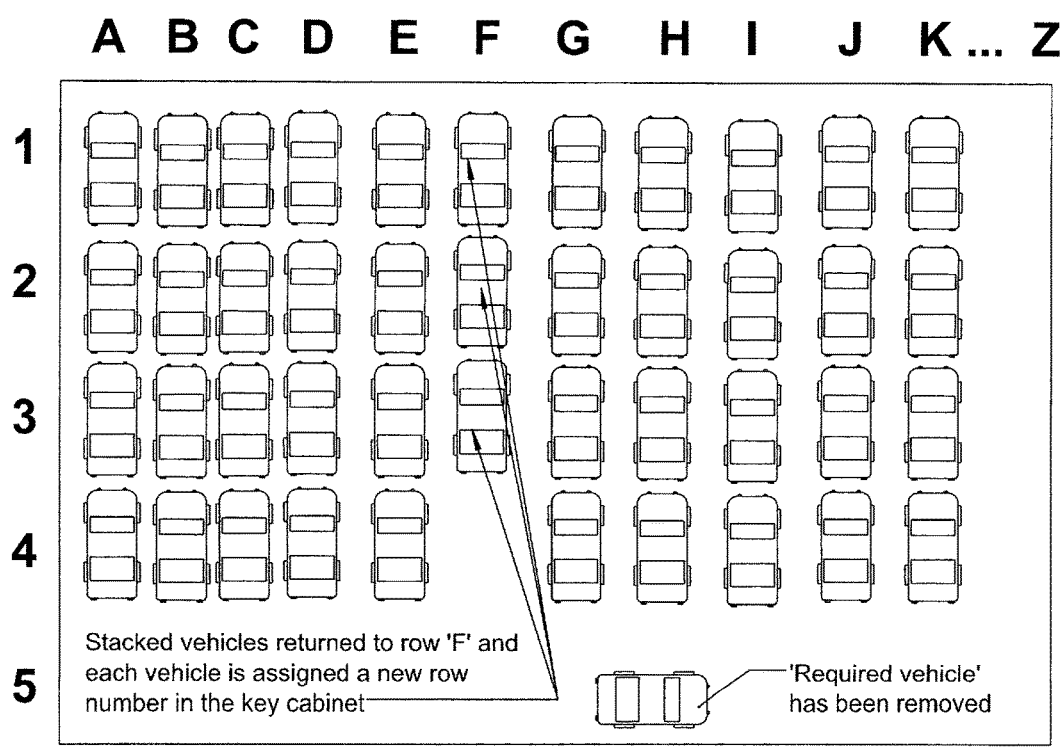
FIG. 35 shows the vehicle retrieved and the previous blocking vehicles returned to the parking locations.

Should a vehicle be parked in a 'stacked position' where other vehicles are blocking access by vehicles parked behind road access, then the computer will advise the user that they will need these keys by lighting the keys in the panel or advise if the key is in position of another user. FIG. 34 shows vehicles that must be removed to retrieve the target vehicle. FIG. 35 shows the vehicle retrieved and the previous blocking vehicles returned to the parking locations.

Vehicles keys for 'F2, F3 & F4 are retrieved by a user who can move the identified blocking vehicles out of the way and retrieve the target vehicle. In FIG. 35 the vehicles that were blocking the "target vehicle from removal are returned to the row. However the vacant F1 space is now filled with another vehicle. The user simply updates the intelligent cabinet using a "field' cell area in the 'App' where an authorised person records the key to the 'parking space'. When a user returns to interrogate the intelligent key cabinet for the vehicle key, updates of the 'vehicle parking' position is displayed along with and vehicles blocking access to that vehicle. Process of removing keys changing vehicle parking position is repeated and updated as the users change relevant 'vehicle parking' data.

The Intelligent Key cabinet records each vehicle's parking position in a way that the user can be notified as a user asks for the key. A 'field' in the App will show the vehicles stated allocated parking position if it has been previously recorded or updated. Users can enter information of a 'parking position' not recorded as a known location. User can place a location description such as 'Parked out front of house 21 in Ding St.'

In a fourth level of facility in addition to the aforesaid features the system allows oversight of global networks and in the case of the car industry, global dealership oversight and reporting based on local, individual and global system activity. In a fifth and sixth level of system activity downloadable upgrades are available for service and maintenance and addition or removal of supporting hardware on site or remotely.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the description of embodiments herein.

The claims defining the invention are as follows:

1. A user interactive system for electronic tracking by users of stored articles and enabling user access to recorded data related to user activity of said articles between a storage and remote locations; each article having a unique article identifier;
    the system including at least one reader to allow said data recording and electronic tracking of engagement by a user with said at least one article in or remote from said storage; and
    the system further comprising user activated electronic devices each in communication with said storage and recorded activity data and in interactive communications with a plurality of other users, each user capable of, concurrent said interactive communications with said plurality of other users, and user activated access to said tracking and stored activity data at said storage, wherein concurrent said interactive communications with said plurality of other users, and with said tracking and stored activity data at said storage allows each user to transfer said user activated access to an article direct to another one or more said users,
    wherein the plurality of users each initiate communications with the data storage via a personal electronic device enabling remote tracking of the location and history of movement of each said articles, and
    wherein the plurality of authorized users after initiating communications with the data storage via a personal electronic device initiate user to user interaction.

2. The system according to claim 1 wherein a user with access to said data storage can transfer that access to at least one other user once said at least one other user has authorized access to the data storage.

3. The system according to claim 2 wherein the initiated user to user interaction enables transfer of one authorized user access to said storage data to at least one other authorized user access via said personal electronic devices.

4. The system according to claim 3 wherein the user initiated electronic input device is selected from at least one of the group consisting of: key pad associated with the data storage, iPhone, tablet, computer, smart phone, internet link, wireless, and Bluetooth.

5. The system according to claim 4 wherein each user initiates a log in registration step via said electronic input device for authorization of said user prior to interaction with at least one other authorized user.

6. The system according to claim 5 wherein each authorized user when allowed access to storage data related to real time and historical status of articles is capable of said transfer of authorization and/or user data to at least one other user.

7. The system according to claim 6 wherein each electronic user device is capable of real time tracking and recording of locations of said articles between said storage and a plurality of remote locations.

8. The system according to claim 7 wherein user selected article status parameters include article identity, type, location, use history, associated keyed equipment, current user possession, access codes, registration and log in data, user data, authorized users.

9. The system according to claim 8 further comprising a security enclosure including at least one panel assembly which receives and retains said articles.

10. The system according to claim 9 wherein each said at least one panel assembly comprises a panel body having a first outer side and a second outer side defining a space therebetween; the panel body capable of receiving and retaining the at least one article supported therein via at least one said first and second outer sides.

11. The system according to claim 10 wherein there is located in the space between the outer first and second sides, an electronics panel including said at least one reader to allow said tracking and recording of movement of said at least one article when the article is moved relative to the panel assembly.

12. The system according to claim 11 wherein each panel is removable from the security enclosure.

13. The system according to claim 12 wherein the panels include pathways and slots to receive and retain said articles in a home position for each article.

14. The system according to claim 13 wherein each said panels include electronics which allow communications between said panel, said user device.

15. The system according to claim 14 wherein each said panel electronics allow communications between said panel and a controller including the system database.

16. The system according to claim 15 wherein there is provided in said a database historical and real time status parameters of each said article accessible by authorized users.

17. The system according to claim 16 wherein unique article identifier is an RFID tag.

18. The system according to claim 17 wherein the article is a security key.

19. The system according to claim 18 wherein the security key is a motor vehicle key.

20. The system according to claim 19 wherein each key includes an RFID tag to enable said tracking of the key.

21. The system according to claim 20 wherein the panel is manufactured from a moulded plastics material an includes a plurality of openings which receive and retain the articles stored by the panel assembly.

22. The system according to claim 21 wherein each opening in the first and second panel parts comprises an elongated slot which receives and retains the RFID tag or the like which provides an identity for each article.

23. The system according to claim 22 wherein the electronics panel comprises a printed circuit board which includes at least one aerial each located to create separate detection fields.

24. A system according to claim 23 wherein, a user is allowed to select from a user menu selected from the group consisting of: finding articles, exchanging articles between users, linking a key with a vehicle, selecting a security cabinet, inspecting user contact lists, recent article activity, finding and locating articles.

25. The system according to claim 24 wherein the article is a gun.

26. The system according to claim 25 wherein the article is a drug.

* * * * *